United States Patent
Yoshikawa

(10) Patent No.: US 9,767,394 B2
(45) Date of Patent: Sep. 19, 2017

(54) DOT RECORDING APPARATUS, DOT RECORDING METHOD, COMPUTER PROGRAM THEREFOR, AND METHOD OF MANUFACTURING RECORDING MEDIUM

(71) Applicant: Seiko Epson Corporation, Tokyo (JP)

(72) Inventor: Eishin Yoshikawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/067,929

(22) Filed: Mar. 11, 2016

(65) Prior Publication Data

US 2016/0263908 A1    Sep. 15, 2016

(30) Foreign Application Priority Data

Mar. 13, 2015    (JP) .................................. 2015-050539

(51) Int. Cl.
  *G06K 15/10* (2006.01)
  *B41J 2/21* (2006.01)
  *H04N 1/047* (2006.01)

(52) U.S. Cl.
  CPC .......... *G06K 15/107* (2013.01); *B41J 2/2132* (2013.01); *H04N 1/047* (2013.01)

(58) Field of Classification Search
  CPC .............................. G06K 15/107; B41J 2/2132
  See application file for complete search history.

(56) References Cited

U.S. PATENT DOCUMENTS

| 4,367,482 | A | 1/1983 | Heinzl |
| 5,633,663 | A | 5/1997 | Matsubara et al. |
| 5,847,721 | A | 12/1998 | Ogata et al. |
| 2007/0236745 | A1 | 10/2007 | Noguchi et al. |
| 2011/0261099 | A1 | 10/2011 | Miyashita et al. |
| 2011/0261100 | A1 | 10/2011 | Miyashita et al. |
| 2015/0015626 | A1* | 1/2015 | Kayahara ............... B41J 2/2132 347/9 |

FOREIGN PATENT DOCUMENTS

| JP | 06-022106 A | 1/1994 |
| JP | 08-244253 A | 9/1996 |
| JP | 2007-306550 A | 11/2007 |
| JP | 2008-307722 A | 12/2008 |
| JP | 2011-230295 A | 11/2011 |
| JP | 2015-016671 A | 1/2015 |

\* cited by examiner

*Primary Examiner* — Alessandro Amari
*Assistant Examiner* — Roger W Pisha, II
(74) *Attorney, Agent, or Firm* — Global IP Counselors, LLP

(57) ABSTRACT

A first mask region is a dot recording region including a pixel position on which a dot is recorded, a second mask region is a dot non-recording region including only a pixel position on which a dot is not recorded, recording of dots is performed so as to overlap the first mask regions with each other in a state where the first mask regions of two masks or more among the P masks are shifted from each other on the recording medium, and D1<D3<D2 is satisfied, when a dot charge rate which is a ratio of dots that are recorded in one pass of the entirety of the dots in a first region A1 on an inner side of boundary lines that form an outer edge of the first mask region in the first mask regions is D1.

16 Claims, 20 Drawing Sheets

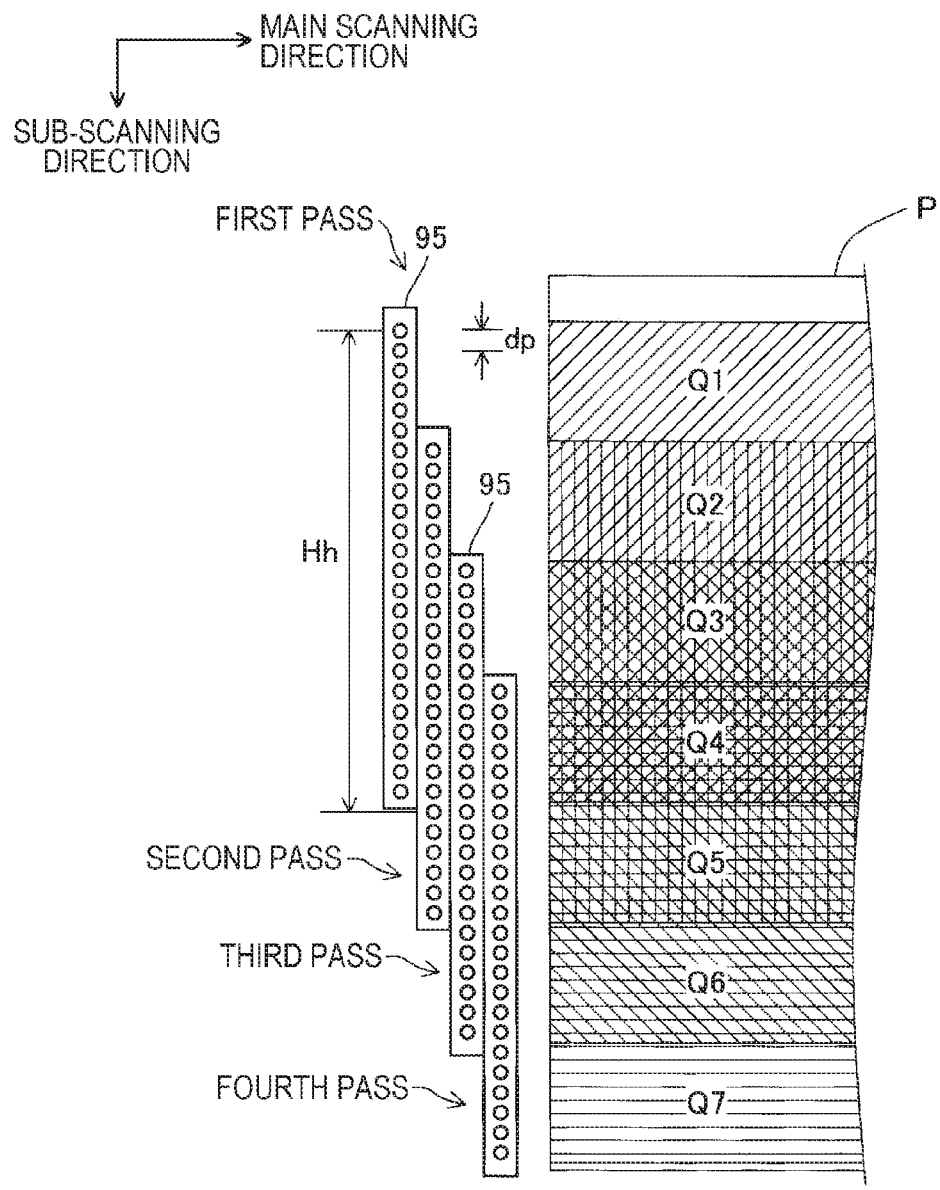

FIRST PASS

SECOND PASS

THIRD PASS

FOURTH PASS

FIRST PASS

SECOND PASS

THIRD PASS

FOURTH PASS

FIRST PASS

SECOND PASS

THIRD PASS

FOURTH PASS

FIFTH PASS

SIXTH PASS

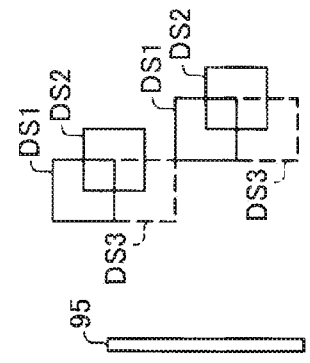
FIG. 20C
THIRD PASS
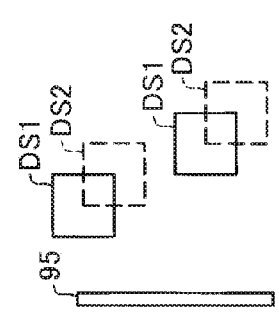
FIG. 20B
SECOND PASS
FIG. 20A
FIRST PASS
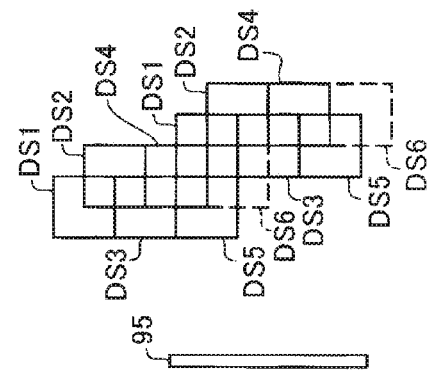
FIG. 20F
SIXTH PASS
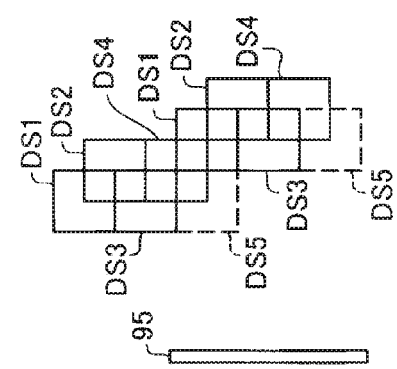
FIG. 20E
FIFTH PASS
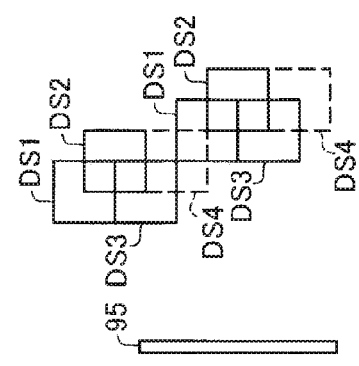
FIG. 20D
FOURTH PASS

DOT RECORDING APPARATUS, DOT RECORDING METHOD, COMPUTER PROGRAM THEREFOR, AND METHOD OF MANUFACTURING RECORDING MEDIUM

BACKGROUND

1. Technical Field

The invention relates to a dot recording apparatus, a dot recording method, a computer program therefor, and a method of manufacturing a recording medium.

2. Related Art

A recording apparatus that reciprocates a plurality of recording heads for discharging ink of different colors on a recording material, and performs recording by performing main scanning when reciprocating, is known as a dot recording apparatus (for example, JP-A-6-022106). In this recording apparatus, pixel groups configured with m×n pixels are arranged so as to be not adjacent to each other within a region in which images can be recorded by one main scanning. In addition, recording is completed by performing the main scanning a plurality of times using a plurality of thinning patterns in complimentary sequence relationships with each other.

In the dot recording apparatus of JP-A-6-022106, there is a case where color streaks or white streaks are generated at boundaries of pixel groups and image quality is degraded in a case where a shift is generated in a main scanning direction or a sub-scanning direction during each scanning pass (JP-A-2015-016671 is an example of the related art.).

SUMMARY

The invention can be realized in the following aspects or application examples.

(1) According to an aspect of the invention, there is provided a dot recording apparatus including a recording head including a plurality of nozzles; a main scanning driving mechanism that performs main scanning passes for forming dots on a recording medium while relatively moving the recording head and the recording medium in a main scanning direction; a sub-scanning driving mechanism that performs sub-scanning for relatively moving the recording medium and the recording head in a sub-scanning direction intersected with the main scanning direction; and a controller that controls the recording head, the main scanning driving mechanism, and the sub-scanning driving mechanism. The controller performs recording of dots during main scanning pass of P times (P is an integer, not a prime number, and is equal to or greater than four) on a main scanning line, and divides each of P masks that illustrate pixel positions of a dot recording target into a plurality of regions of the main scanning pass of the P times. A first mask region in the plurality of regions is a dot recording region including a pixel position on which a dot is recorded. A second mask region in the plurality of regions is a dot non-recording region including only a pixel position on which a dot is not recorded. Recording of dots is performed so as to overlap the first mask regions with each other in a state where the first mask regions of two masks or more among the P masks are shifted from each other on the recording medium. Dots are recorded so as to be D1<D3<D2, when a dot charge rate which is a ratio of dots that are recorded in one pass of the entirety of the dots in a first region A1 on an inner side of boundary lines that form an outer edge of the first mask region in the first mask regions is D1, when a dot charge rate of a second region A2 that is overlapped with the first region A1 of other masks in the first mask regions is D2, and when a dot charge rate of a third region A3 that is a region excluding the first region A1 and the second region A2 in the first mask regions is D3. According to this aspect, since the dot charge rate D1 of a region A1 along boundaries of dot recording regions is smaller than dot charge rates of other regions A2 and A3, and recording is overlapped in a second region A2 with a greater dot charge rate, even when shifting is generated between passes in the main scanning pass, it is possible that the color streaks or the white streaks are less noticeable. As a result, the degradation of image quality is suppressed.

(2) In the above dot recording apparatus, the boundary lines may not be parallel to any one of the main scanning direction and the sub-scanning direction. According to this aspect, since the boundary lines are not parallel to any one of the main scanning direction and the sub-scanning direction, it is possible that the banding is less noticeable compared to a case where boundary lines are parallel in the main scanning direction or boundary lines are parallel in the sub-scanning direction.

(3) In the above dot recording apparatus, a shape of the first mask region in a first pass and a shape of the first mask region in a second pass may be the same shape. According to this aspect, it is possible to reduce a memory requirement for defining a mask.

(4) In the above dot recording apparatus, a shape of the first mask region in the first pass and a shape of the first mask region in the second pass may be different shapes. According to this aspect, it is possible that the banding is less noticeable.

(5) In the above dot recording apparatus, the controller may gradually change a dot charge rate in at least one of a boundary between the first region A1 and the second region A2, a boundary between the first region A1 and the third region A3, and a boundary between the second region A2 and the third region A3. According to this aspect, additionally, it is possible that the color streaks or the white streaks are less noticeable.

It is possible to realize various aspects of the invention, for example, a dot recording method, a computer program for creating raster data in order to perform dot recording, a storage medium that accommodates a computer program for creating raster data in order to perform dot recording, a method of manufacturing a recording medium, and a recording medium on which dots are recorded, other than the dot recording apparatus.

BRIEF DESCRIPTION OF THE DRAWINGS

The invention will be described with reference to the accompanying drawings, wherein like numbers reference like elements.

FIG. 3 is an explanatory view illustrating the position of the nozzle array and a recording region in the position in each main scanning pass of dot recording according to a first embodiment.

FIGS. 20A to 20F are explanatory views schematically illustrating positions of the nozzle array and dot recording regions in six passes from the first pass to a sixth pass.

DESCRIPTION OF EXEMPLARY EMBODIMENTS

First Embodiment

Figure 1:
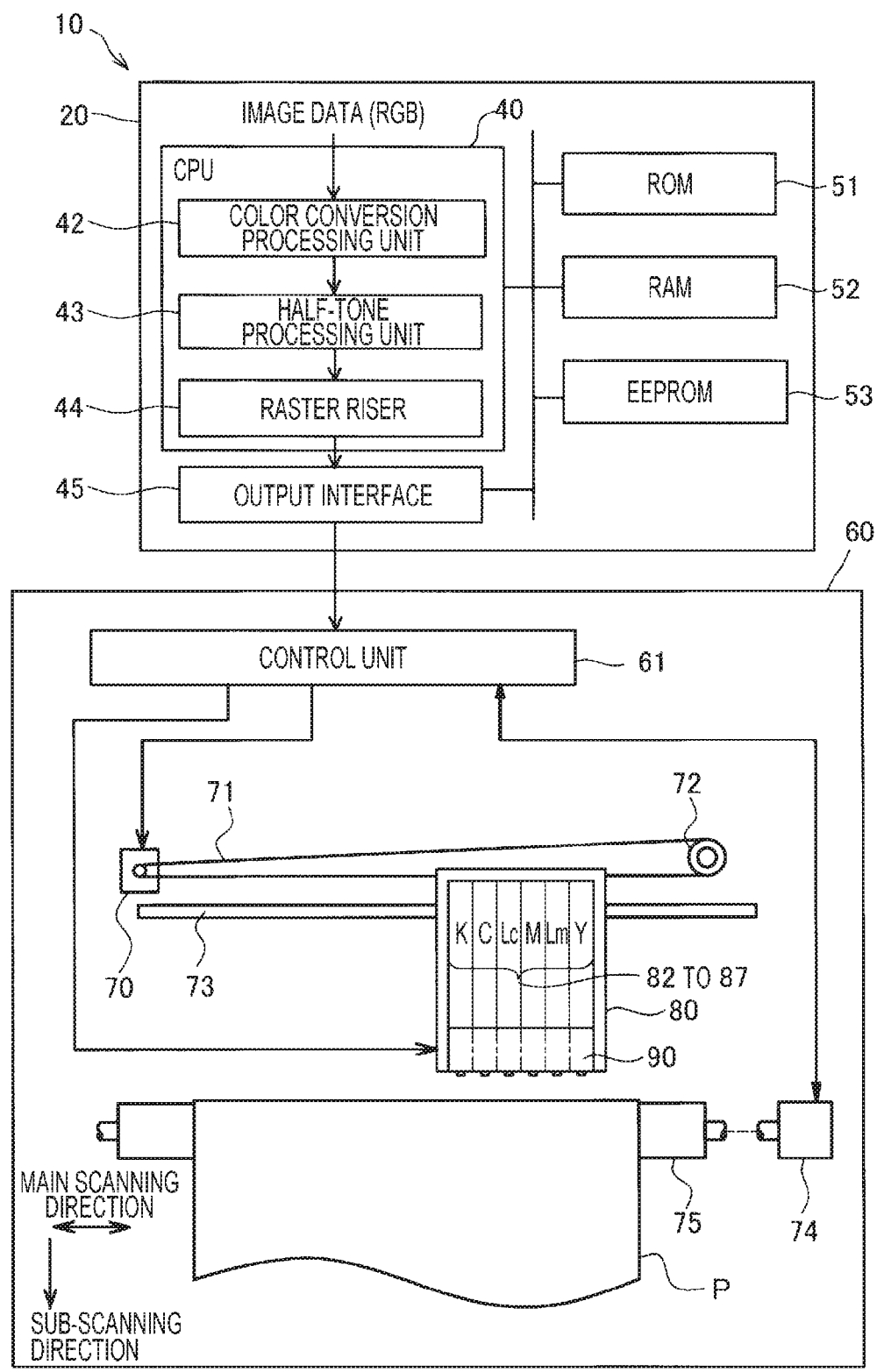
FIG. 1 is an explanatory view illustrating a configuration of a dot recording system.

FIG. 1 is an explanatory view illustrating a configuration of a dot recording system. The dot recording system 10 includes an image processing unit 20 and a dot recording unit 60. The image processing unit 20 generates recording data for the dot recording unit 60 from image data (for example, image data of RGB).

The image processing unit 20 includes a CPU 40 (referred to as a "controller 40"), a ROM 51, a RAM 52, an EEPROM 53, and an output interface 45. The CPU 40 has functions of a color conversion processing unit 42, a half-tone processing unit 43, and a raster riser 44. These functions are realized by a computer program. The color conversion processing unit 42 converts multi-tone RGB data of image into ink amount data that represents the amount of ink in plural colors of ink. The half-tone processing unit 43 creates dot data that represents a dot formed state for every pixel by performing half-tone processing on the ink amount data. The raster riser 44 sorts the dot data created from the half-tone processing as dot data used in each main scanning by the dot recording unit 60. Hereinafter, the dot data for each main scanning generated by the raster riser 44 is referred to as "raster data". The operation of the following dot recording described in various embodiments is a rasterization operation (that is, operation represented by raster data) realized by the raster riser 44.

The dot recording unit 60 is, for example, a serial type ink jet recording apparatus, and includes a control unit 61, a carriage motor 70, a driving belt 71, a pulley 72, a sliding shaft 73, a paper feed motor 74, a paper feed roller 75, a carriage 80, ink cartridges 82 to 87, and a recording head 90.

The driving belt 71 is stretched between the carriage motor 70 and the pulley 72. The carriage 80 is attached to the driving belt 71. For example, the ink cartridges 82 to 87 in which cyan ink (C), magenta ink (M), yellow ink (Y), black ink (K), light cyan ink (Lc), and light magenta ink (Lm) are respectively accommodated are mounted on the carriage 80. In addition, it is possible to use ink of various types other than these examples as the ink. A nozzle array corresponding to the ink of each of the above colors is formed in the recording head 90 at a lower portion of the carriage 80. It is possible to supply the ink from each of the ink cartridge to the recording head 90 when these ink cartridges 82 to 87 are installed in the carriage 80 from the above. The sliding shaft 73 is arranged in parallel with the driving belt 71, and penetrates the carriage 80.

The carriage 80 moves along the sliding shaft 73 when the carriage motor 70 drives the driving belt 71. This direction is referred to as a "main scanning direction". The carriage motor 70, the driving belt 71, and the sliding shaft 73 constitute a main scanning driving mechanism. The ink cartridges 82 to 87 and the recording head 90 also move in the main scanning direction with the movement of the carriage 80 in the main scanning direction. Dot recording on a recording medium P is performed by ejecting the ink from nozzles (described later) disposed in the recording head 90 on the recording medium P (typically recording paper) when moving in the main scanning direction. In this manner, the movement in the main scanning direction and the ejection of the ink of the recording head 90 are referred to as main scanning, and one main scanning is referred to as "main scanning pass" or simply "pass".

The paper feed roller 75 is connected to the paper feed motor 74. The recording medium P is inserted onto the paper feed roller 75 when recording. The control unit 61 rotates the paper feed motor 74 when the carriage 80 moves up to an end portion in the main scanning direction. With this, the paper feed roller 75 is also rotated and moves the recording medium P. The relative movement direction between the recording medium P and the recording head 90 is referred to as a "sub-scanning direction". The paper feed motor 74 and the paper feed roller 75 constitute a sub-scanning driving mechanism. The sub-scanning direction is a direction (orthogonal direction) perpendicular to the main scanning direction. However, the sub-scanning direction and the main scanning direction are not necessarily perpendicular to each other, and may be crossed with each other. In many cases, a main scanning operation and a sub-scanning operation are alternately performed. In addition, it is possible to perform at least one of a unidirectional recording operation to perform the dot recording only in the forward direction of the main scanning, and a bidirectional recording operation to perform the dot recording in the forward and backward direction of the main scanning. Since the main scanning in the forward direction and the main scanning in the backward direction are reversed only along the path of the main scanning, the main scanning in the forward direction and the main scanning in the backward direction will be described without particularly discriminating between the forward and the backward directions in the following description.

The image processing unit 20 may be integrally formed with the dot recording unit 60. In addition, the image processing unit 20 may be separately formed with the dot recording unit 60 by accommodating the image processing unit 20 in a computer (not illustrated). In this case, the image processing unit 20 may be executed by a CPU as recorder driver software (computer program) on the computer.

Figure 2:
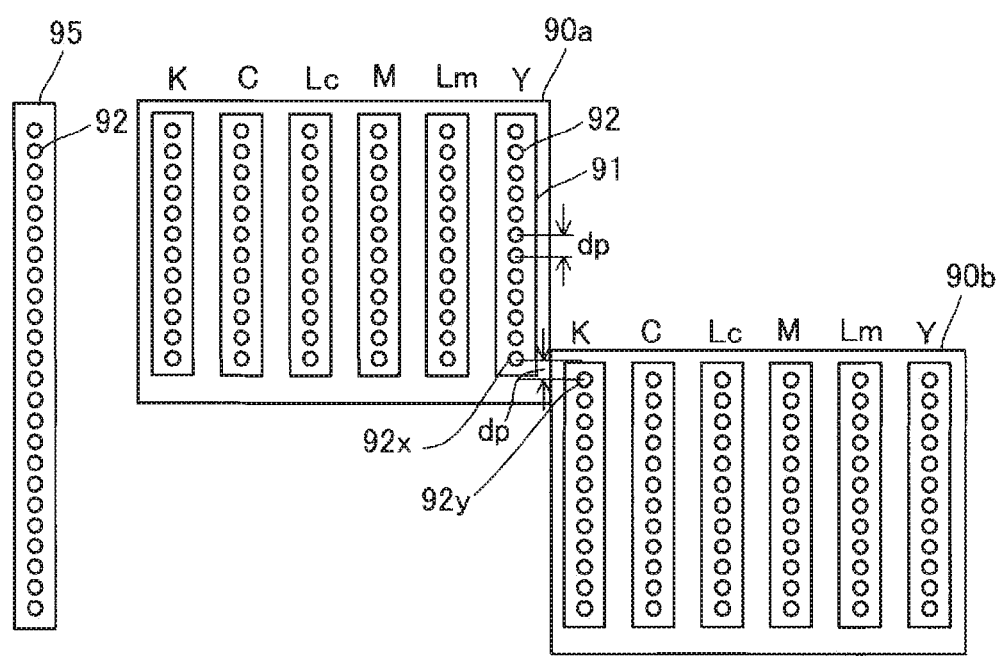
FIG. 2 is an explanatory view illustrating an example of a configuration of a nozzle array of a recording head.

FIG. 2 is an explanatory view illustrating an example of a configuration of a nozzle array of the recording head 90. In FIG. 2, two recording heads 90 are illustrated. However, the recording head 90 may be one or equal to or greater than two. The two recording heads 90a and 90b include nozzle arrays 91 for every color. Each of the nozzle arrays 91 includes a plurality of nozzles 92 arranged in the sub-scanning direction at a constant nozzle pitch dp. A nozzle 92x in an end of the nozzle array 91 of the first recording head 90a and a nozzle 92y in an end of the nozzle array 91 of a second recording head 90b are shifted only by the nozzle pitch dp in the sub-scanning direction in the nozzle array 91. In this case, a nozzle array for one color of the two recording heads 90a and 90b are equivalent to a nozzle array 95 (illustrated on the left side of FIG. 2) having the number of nozzles two times the number of nozzles for one color of one recording head 90. In the following description, a method for performing dot recording for one color will be described using the equivalent nozzle array 95. In addition, the nozzle pitch dp is equal to a pixel pitch on the recording medium P in a first embodiment. However, it is possible that the nozzle pitch dp is an integer multiple of the pixel pitch on the recording medium P. In a later case, so-called interlace recording (operation by which dots are recorded in second and subsequent passes so as to fill the gaps of the dots between the main scan lines which are recorded in one pass) is performed. The nozzle pitch dp, for example, is a value (0.035 mm) corresponding to 720 dpi.

FIG. 3 is an explanatory view illustrating the position of the nozzle array 95 and a recording region in the position in each main scanning pass of dot recording according to the first embodiment. In the following description, a case where dots are formed on the entirety of pixels of the recording medium P using one color ink (for example, cyan ink) will be described as an example. In the present specification, dot recording in which main scanning passes (simply referred to as a "pass") of P times (P is an integer equal to or greater than four) are terminated is referred to as "multi-pass recording" in order to form dots on each main scan line. In the first embodiment, the number of passes P of the multi-pass recording is four. The position of the nozzle array 95 is shifted in the sub-scanning direction by a distance corresponding to a quarter of a head height Hh in a first pass ((n+1)-th pass (n is an integer equal to or greater than zero)) (1P) and a second pass ((n+2)-th pass) (2P). The position of the nozzle array 95 is shifted from each position of the previous pass in the sub-scanning direction by a distance corresponding to a quarter of a head height Hh for a third pass ((n+3)-th pass) (3P) and a fourth pass ((n+4)-th pass) (4P). Here, the "head height Hh" means a distance that is represented as M×dp (M is the number of nozzles of the nozzle array 95 and dp is the nozzle pitch).

In the (n+1)-th pass, dots are recorded on some pixels of the entirety of pixels in regions Q1 to Q4 of the recording medium P. In the (n+2)-th pass, dots are recorded on some pixels of the entirety of pixels in regions Q2 to Q5 of the recording medium P. In the (n+3)-th pass, dots are recorded on some pixels of the entirety of pixels in regions Q3 to Q6, and in the (n+4)-th pass, dots are recorded on some pixels of the entirety of pixels in regions Q4 to Q7. In the region Q4, 100% of recording on pixels is performed as a total of four passes of the (n+1)-th pass, the (n+2)-th pass, the (n+3)-th pass, and the (n+4)-th pass. In the following embodiments, "n+" will be omitted such that the (n+1)-th pass is the first pass, the (n+2)-th pass is the second pass, and the like. In addition, when assuming a case of forming an image (solid image) on the recording medium P so as to form dots on the entirety of the pixels on the recording medium P in this disclosure, a recording image represented by actual dot data includes pixels which actually form dots on the recording medium P and pixels which do not actually form dots on the recording medium P. That is, whether or not dots are actually formed on each pixel of the recording medium P is determined by dot data generated by the half-tone processing. In the present specification, a term referred to as "dot recording" means "performing formation or non-formation of dots". In addition, a term "performing dot recording" does not indicate any difference between whether or not dots on the recording medium P are actually formed, and is used as a term that means "in charge of dot recording".

Figure 4A:
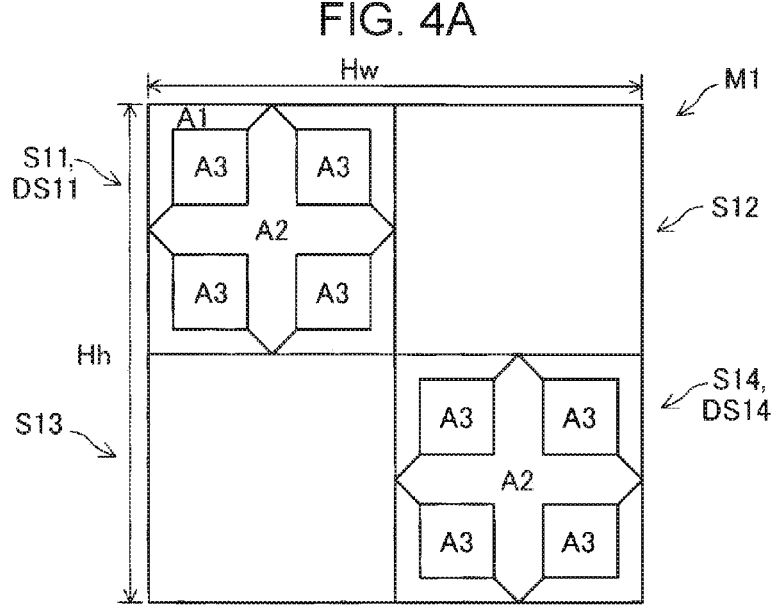
FIGS. 4A to 4B are explanatory views illustrating a mask used in a first pass according to the first embodiment.
Figure 4B:
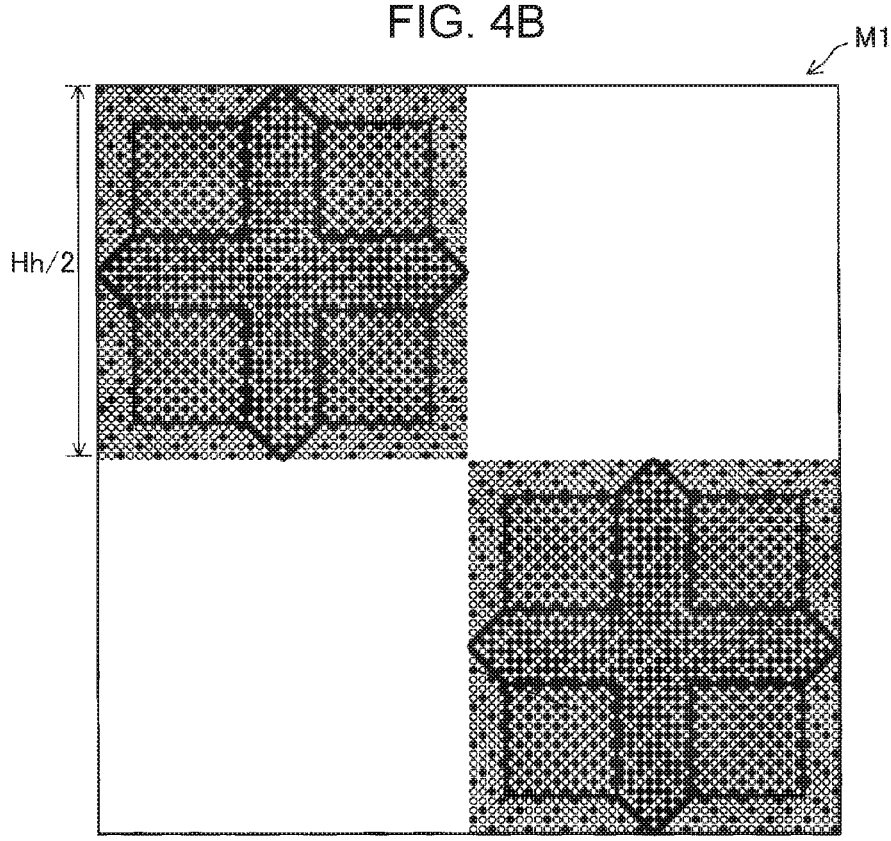

FIGS. 4A to 4B are explanatory views illustrating a mask M1 used in a first pass according to the first embodiment. In addition, masks M2 to M4 used in the second pass to the fourth pass are the same as the mask M1. The mask M1 illustrates a pixel position of a dot recording target in a main scanning pass. The size of the mask M1 in the main scanning direction is Hw, and the size in the sub-scanning direction is Hh the same as the size of the head array 95. FIG. 4A is a view in which the mask M1 is grouped into a plurality of regions using a dot charge rate. The mask M1 is divided into total four mask regions S11, S12, S13, and S14 by dividing the mask M1 into two regions in the main scanning direction and two regions in the sub-scanning direction. In the first embodiment, the four mask regions S11, S12, S13, and S14 are configured with a rectangular shape having sides parallel with the main scanning direction and the sub-scanning direction, and the sizes of the four mask regions S11, S12, S13, and S14 are the same.

The mask regions S12 and S13 are respectively arranged on an upper right portion and a lower left portion of the mask M1 of FIG. 4A. The mask regions S12 and S13 are dot non-recording regions (corresponding to the "second mask region" of claim) including only pixel positions on which dots are not recorded in each pass. The mask regions S11 and S14 are respectively arranged on an upper left portion and a lower right portion of the mask M1 of FIG. 4A. The mask regions S11 and S14 are dot recording regions (corresponding to the "first mask region" of claim) including pixel positions on which dots are recorded in each pass. The mask regions S11 and S14 are called as a "dot recording region DS11" and a "dot recording region DS14" by attaching a character of "D" as an acronym. The D is used as the acronym in the dot recording regions in the same manner in other embodiments. In addition, it is preferable that the "dot recording regions" are configured with the smallest rectangular shape possible (preferably a square shape) including pixel positions on which dots are recorded. The dot recording regions DS11 and DS14 are further divided into three regions A1, A2, and A3. In addition, first regions A1 and third regions A3 are four, respectively. However, the four first regions A1 are configured with the same shape and the same dot charge rate as the first embodiment. The same is applied in the third regions A3. Since an arrangement, a shape, and a dot charge rate of the regions A1 to A3 in the mask region S11 and the mask region S14 are the same, the mask region S11 will be described as an example.

The first region A1 is a region configured along a boundary line on the inner side of the boundary line which is an outer edge of the dot recording region DS11 of the mask region S11. In addition, the "boundary line" means a virtual line passing between adjacent pixels in the present embodiment. The second regions A2 are regions that are overlapped with first regions A1 of other masks M2 and M4 when other masks M2 and M4 are applied in the second pass and the fourth pass, and, that is, with regions on an inner side of boundary lines which are an outer edge of dot recording regions DS21, DS24, DS41, and DS44 of other mask regions M2 and M4. In addition, since boundary lines of the dot recording region DS11 and boundary lines of dot recording regions DS21, DS24, DS41, and DS44 of the mask regions M2 and M4 intersects, the first regions A1 and the second regions A2 are divided, for example, by a virtual line where distances between boundary lines of the dot recording region DS11 and boundary lines of dot recording regions DS21, DS24, DS41, and DS44 of the mask regions M2 and M4 are approximately equidistant in the vicinity of the intersection. The third regions A3 are regions, other than the first regions A1 and the second regions A2, in the dot recording region DS11.

The dot charge rate is the ratio of dots to be recorded in a single pass on the entirety of the dots of the regions. In the present embodiment, the dot charge rate D3 of the third regions A3 is 50%, and the dot charge rate D1 of the first regions A1 is, for example, 25% smaller than the dot charge rate D3 of the third regions A3. The dot charge rate D2 of the second regions A2 is 75% greater than that of the dot charge rate D3 of the third regions A3. In addition, the dot charge rates may be D1<D3<D2. In addition, it is preferable that the sum of the dot charge rate D1 and the dot charge rate D2 is 100% in this embodiment.

FIG. 4B is a view illustrating an example of positions of dots. Black dots are dots (pixel positions) recorded in a pass, and white dots are dots (pixel positions) not recorded in the pass. In addition, since it is difficult to illustrate the white dots in the mask regions S12 and S13, the illustration of the white dots are omitted.

Figure 5A:
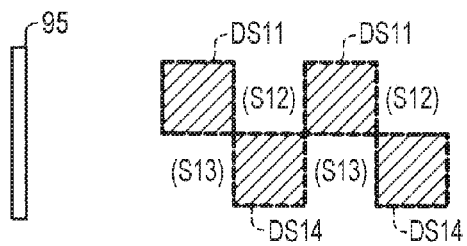
FIGS. 5A to 5D are explanatory views schematically illustrating positions of the nozzle array and recorded dots in four passes from the first pass to a fourth pass.

FIGS. 5A to 5D are explanatory views schematically illustrating positions of the nozzle array 95 and recorded dots in four passes from the first pass to a fourth pass. FIG. 5A illustrates a state where the first pass is recorded. In the first pass, regions corresponding to the dot recording regions DS11 and DS14 are recorded as a checker pattern.

Figure 5B:
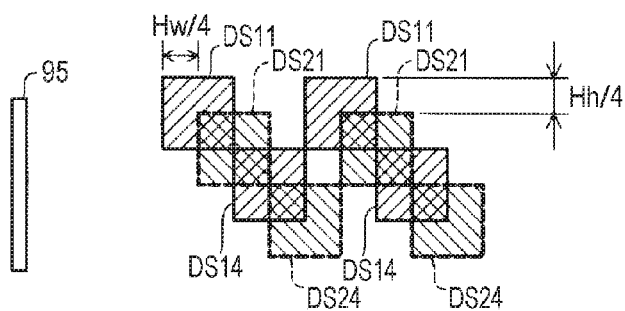

FIG. 5B illustrates a state where the second pass is recorded. In the second pass, the nozzle array 95 is moved in the sub-scanning direction by Hh/4, and performs dot recording at a position, as a starting position, which is moved in the main scanning direction by Hw/4 with respect to the first pass. As a result, a part of the dot recording region DS11 of the mask M1, and a part of the dot recording region DS21 of the mask M2 are overlapped with each other. Similarly, a part of the dot recording region DS14 of the mask M1, and a part of the dot recording region DS21 of the mask M2 are overlapped with each other, and a part of the dot recording region DS14 of the mask M1, and a part of the dot recording region DS24 of the mask M2 are overlapped with each other.

Figure 5C:
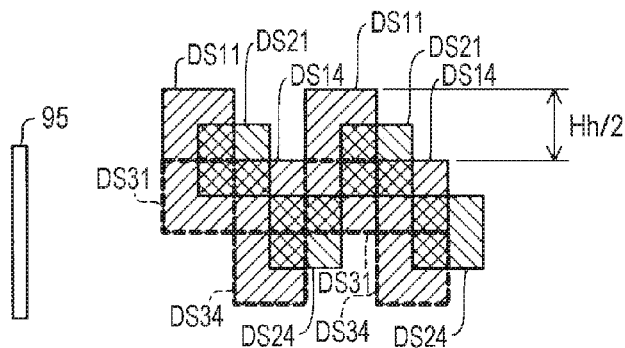

FIG. 5C illustrates a state where the third pass is recorded. In the third pass, the nozzle array 95 is moved in the sub-scanning direction by Hh/2, and performs dot recording at a position, as a starting position, which is not moved in the main scanning direction with respect to the first pass. As a result, the dot recording region DS31 of the mask M3 forms a layer filling the mask regions S13 of the mask M1. The "layer" in this embodiment means a "virtual layer" that is formed by arranging a plurality of masks in tile shapes equal to or greater than two so as to not have a dot non-recording region, by a plurality of passes (it is not necessary to be a continuous pass) in which the dot recording regions are not overlapped with each other. In this embodiment, a single layer is formed in the first pass and the third pass. It is possible to determine in advance the most appropriate combination of multiple passes, as the pass of forming each layer, based on a shape and a position of the dot recording region of a mask of each layer. In addition, a part of the dot recording region DS21 of the mask M2 and a part of the dot recording region DS31 of the mask M3 are overlapped with each other, a part of the dot recording region DS24 of the mask M2 and a part of the dot recording region DS34 of the mask M3 are overlapped with each other, and a part of the dot recording region DS24 of the mask M2 and a part of the dot recording region DS31 of the mask M3 are overlapped with each other.

Figure 5D:
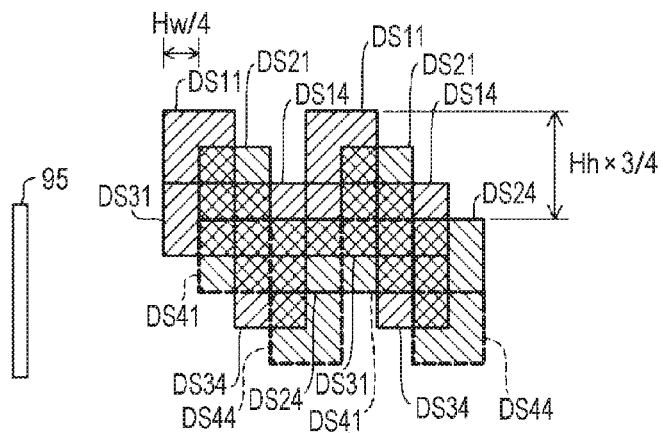

FIG. 5D illustrates a state where the fourth pass is recorded. In the fourth pass, the nozzle array 95 is moved in the sub-scanning direction by (3×Hh)/4, and performs dot recording at a position, as a starting position, which is moved in the main scanning direction by Hw/4 with respect to the first pass. As a result, the dot recording region DS41 of the mask M4 forms a layer filling the mask regions S23 of the mask M2. Accordingly, in this embodiment, a single layer is formed in the second pass and the fourth pass. A part of the dot recording region DS31 of the mask M3 and a part of the dot recording region DS41 of the mask M4 are overlapped with each other, a part of the dot recording region DS34 of the mask M3 and a part of the dot recording region DS41 of the mask M4 are overlapped with each other, and a part of the dot recording region DS34 of the mask M3 and a part of the dot recording region DS44 of the mask M4 are overlapped with each other.

Figure 6A:
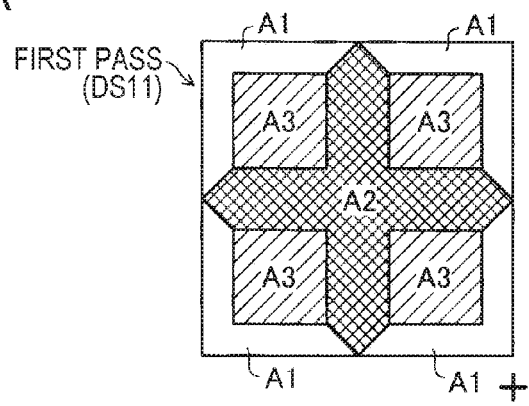
FIGS. 6A to 6C are explanatory views illustrating portions on which a dot recording region in the first pass and a dot recording region in the second pass are overlapped with each other.
Figure 6B:
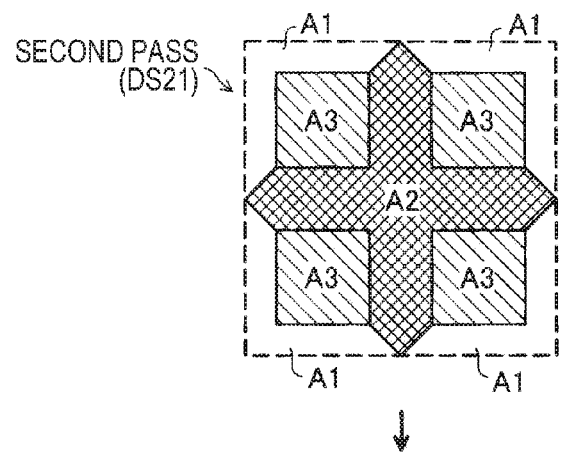
Figure 6C:
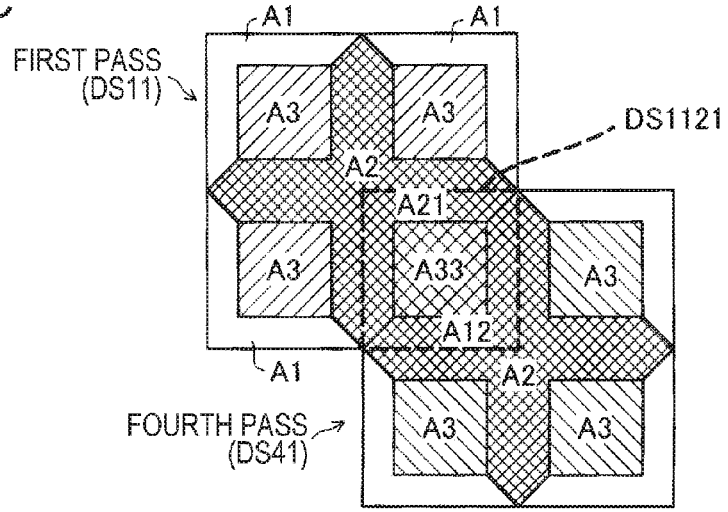

FIGS. 6A to 6C are explanatory views illustrating a portion DS1121 in which a dot recording region DS11 in the first pass and a dot recording region DS21 in the second pass are overlapped with each other. FIG. 6A illustrates the dot recording region DS11, FIG. 6B illustrates the dot recording region DS21, and FIG. 6C illustrates a state where the dot recording region DS11 and the dot recording region DS21 are overlapped with each other. As illustrated in FIG. 6C, the overlapped portion DS1121 can be divided into three regions of regions A21, A12, and A33. The region A21 is an upper side portion and a left side portion of the overlapped portion DS1121, and a portion in which the second region A2 of the dot recording region DS11 and the first region A1 of the dot recording region DS21 are overlapped with each other. The region A12 is a lower side portion and a right side portion of the overlapped portion DS1121, and a portion in which the first region A1 of the dot recording region DS11 and the second region A2 of the dot recording region DS21 are overlapped with each other. The region A33 is a portion in which the center portion of the overlapped portion DS1121 is formed in a rectangular shape and a portion in which the third region A3 of the dot recording region DS11 and the third region A3 of the dot recording region DS21 are overlapped with each other.

Although it is not described in the description of FIGS. 4A and 4B, dots (dots recorded in the second region A2 of the dot recording region DS11, dot charge rate 75%) recorded in the first pass and dots (dots recorded in the first region A1 of the dot recording region DS21, dot charge rate 25%) recorded in the second pass in the region A21 are complementary to one another, and the entirety of the dots (the total dot charge rate 100%) is recorded in the two passes. Similar to other regions A21 and A33, dots recorded by the first pass and dots recorded by the second pass are complementary to one another, and the entirety of the dots (the total dot charge rate 100%) is recorded in the two passes. That is, the entirety of dots of the overlapped portion DS1121 is recorded in the two passes. The same is applied in overlapped portions of two dot recording regions in other passes.

Figure 7A:
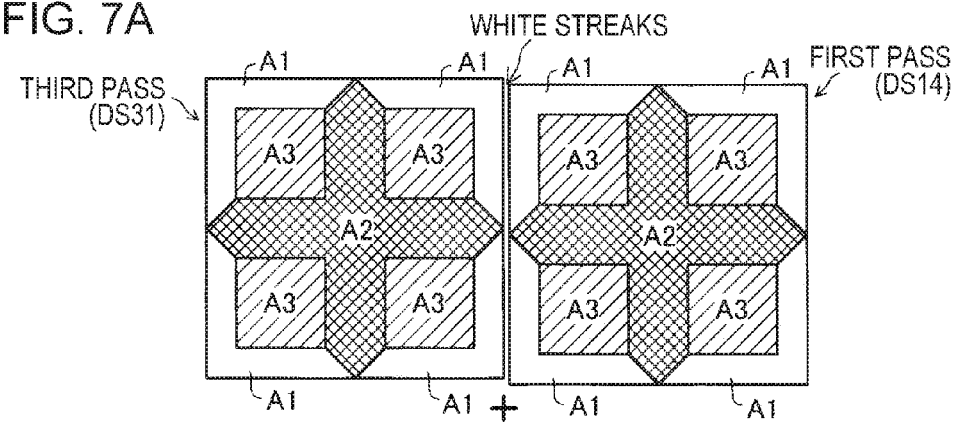
FIGS. 7A to 7C are explanatory views illustrating cases where a gap is generated by shifting the dot recording region in the third pass with respect to the dot recording region in the first pass.
Figure 7B:
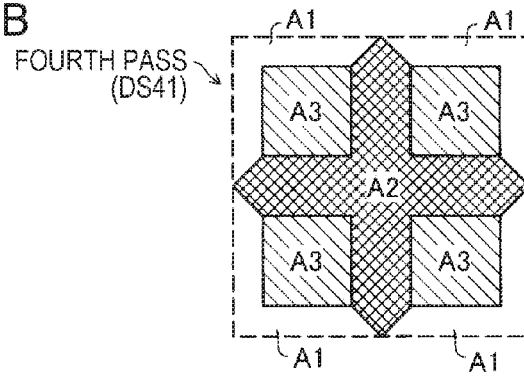
Figure 7C:
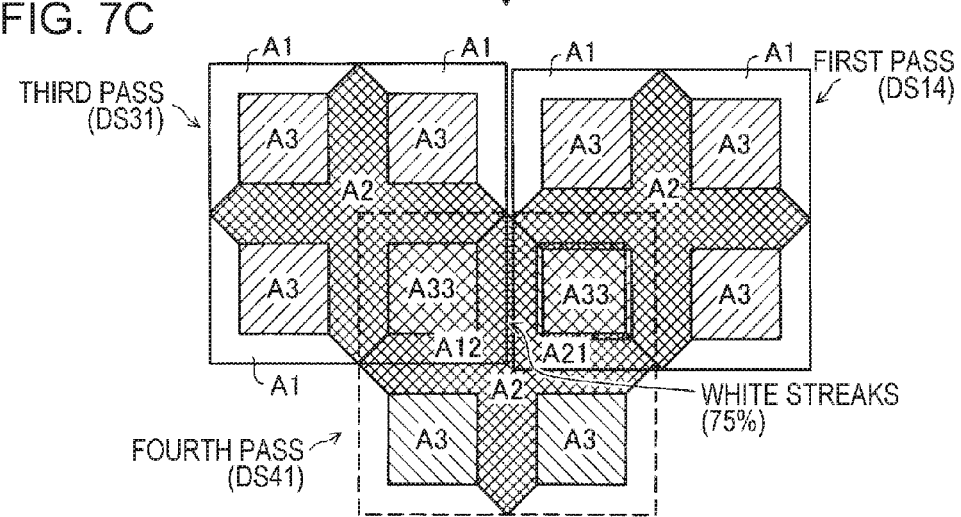

FIGS. 7A to 7C are explanatory views illustrating cases where a gap is generated by shifting the dot recording region DS31 in the third pass with respect to the dot recording region DS11 in the first pass. FIG. 7A illustrates a case where a gap (white streaks) is generated by shifting the dot recording region DS31 in the third pass with respect to the dot recording region DS11 in the first pass. A white streaks portion has the dot charge rate of 0% because there is no dots which are hit. In addition, the second pass is omitted because the figure becomes complicated. FIG. 7B is an explanatory view illustrating a dot recording region DS41 in the fourth pass. The dot recording region DS41 is recorded so as to overlap a part thereof with the dot recording region DS11 in the first pass, and a part thereof with the dot recording region DS31 in the third pass.

FIG. 7C is an explanatory view illustrating a state where a dot recording region DS41 is recorded in the fourth pass. A white streaks portion has the dot charge rate of 75% after recording of the dot recording region DS41 in the fourth pass so as to overlap with the second region A2 (dot charge rate 75%) of the dot recording region DS41. In addition, both sides of the white streaks have the dot charge rate of 100% after recording of the fourth pass because of the first region A1 having the dot charge rate of 25%. Accordingly, the difference of dot charge rates of the white streaks portion and the both sides is 25%.

Figure 8A:
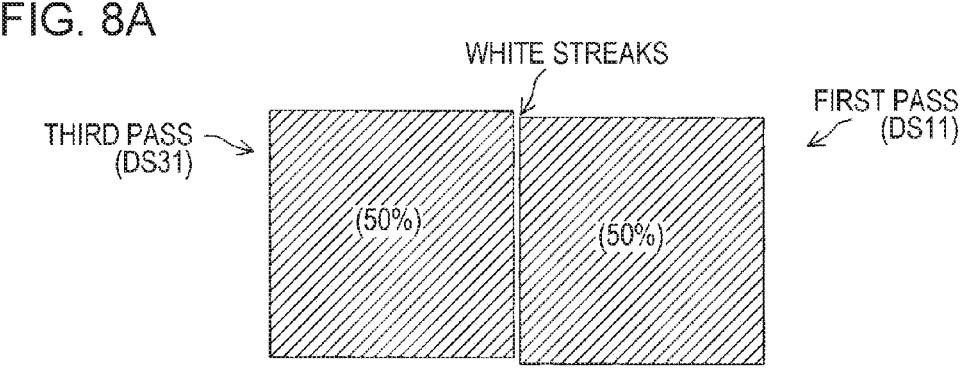
FIGS. 8A to 8C are explanatory views illustrating cases where a gap is generated by shifting a dot recording region in the first pass and a dot recording region in the third pass as a comparative example.
Figure 8B:
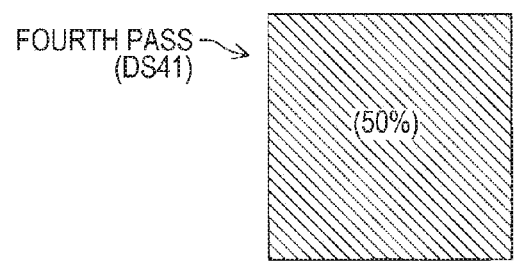
Figure 8C:
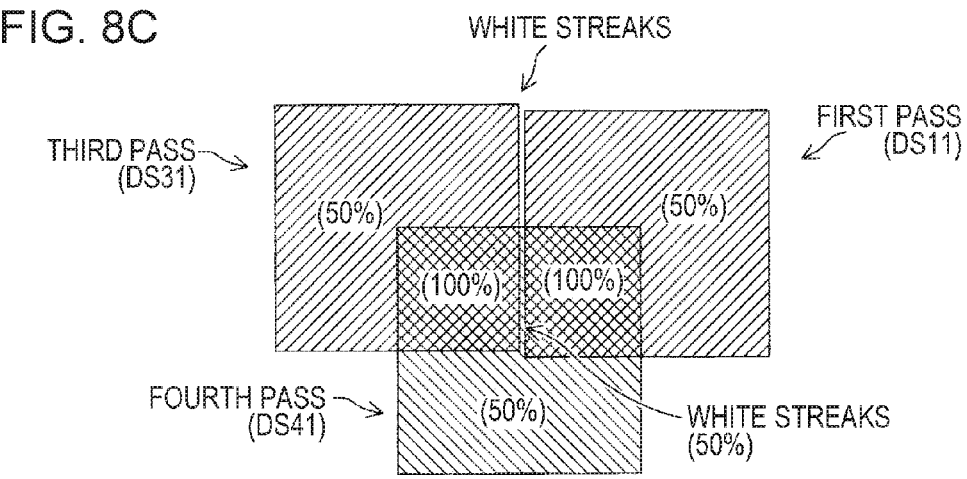

FIGS. 8A to 8C are explanatory views illustrating cases where a gap is generated by shifting the dot recording region DS11 in the first pass and a dot recording region DS31 in the second pass as a comparative example. FIG. 8A illustrates a case where a gap (white streaks) is generated by shifting the dot recording region DS31 in the third pass with respect to the dot recording region DS11 in the first pass. FIG. 8B is an explanatory view illustrating the dot recording region DS41 in the fourth pass. FIG. 8C illustrates a state where the dot recording region DS41 in the fourth pass is recorded. In the comparative example, a charge rate of dot recording is uniform (50%) in the entirety of the regions without dividing the dot recording regions DS11, DS14, and the like into regions A1 to A3. The white streaks portion has the dot charge rate of 50% after recording in the fourth pass so as to overlap with the dot recording region DS41 (dot charge rate 50%). In addition, since both sides of the white streaks are regions having the dot charge rate of 50%, the both sides of the white streaks have the dot charge rate of 100% after recording of dot recording region DS41 in the fourth pass. Accordingly, the difference of dot charge rates of the portion of the white streaks and the both sides is 50%.

In the comparative example, a dot charge rate of the white streaks portion is 50% lower than that of the both sides. However, the dot charge rate of the white streaks portion is only 25% lower than that of the first embodiment. Accordingly, it is possible that the white streaks are less noticeable in the first embodiment compared to the comparative example.

Figure 9A:
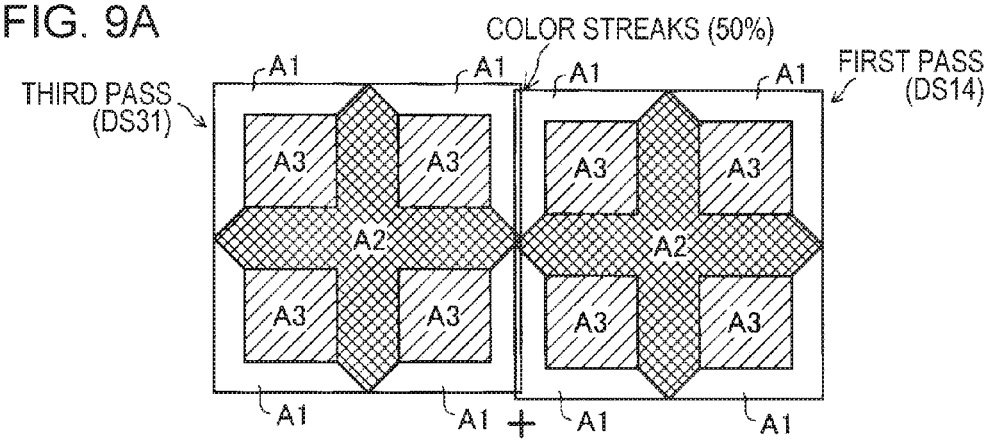
FIGS. 9A to 9C are explanatory views illustrating cases where the dot recording region in the third pass is shifted and overlapped to the dot recording region in the first pass.
Figure 9B:
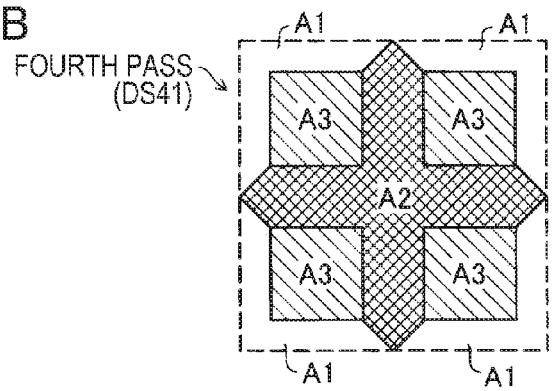
Figure 9C:
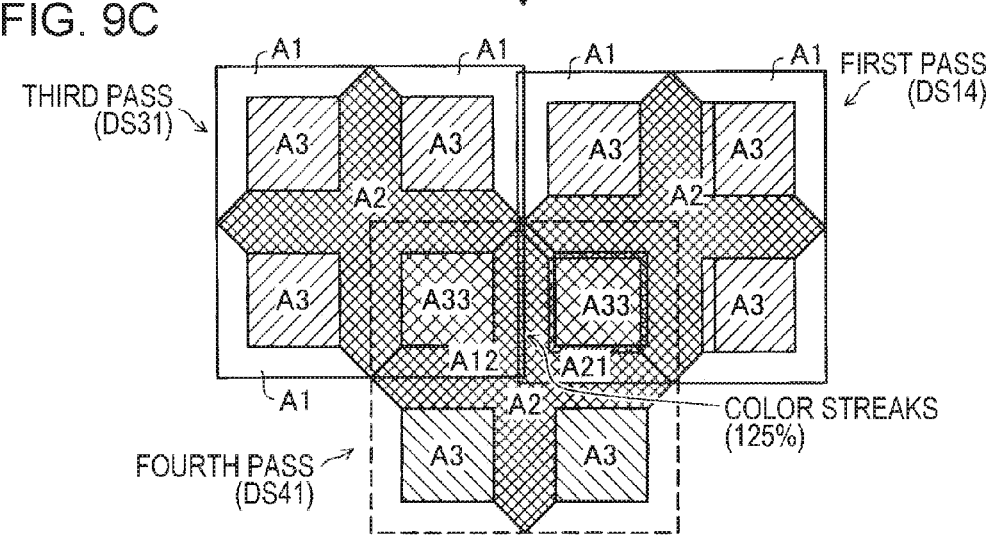

FIGS. 9A to 9C are explanatory views illustrating cases where the dot recording region DS31 in the third pass is shifted to be overlapped with the dot recording region DS11 in the first pass. FIG. 9A illustrates that the dot recording region DS31 in the third pass is shifted to be overlapped to the dot recording region DS11 in the first pass, and the color streaks are generated. Since the color streaks portion is overlapped with the first region A1 of the dot charge rate of 25%, the dot charge rate of the color streaks portion is 50%. In addition, the first region A1 in the second pass is omitted because the figure is complicated. FIG. 9B is an explanatory view illustrating the dot recording region DS41 in the fourth pass. The dot recording region DS41 is recorded so as to overlap a part thereof with the dot recording region DS11 in the first pass and a part thereof with the dot recording region DS31 in the third pass. FIG. 9C is an explanatory view illustrating a state where the dot recording region DS41 is recorded in the fourth pass. Since the color streaks portion is overlapped with the second region A2 (dot charge rate 75%) of a dot recording region DS41, the dot charge rate of the color streaks portion is 125% after recording of the dot recording region DS41 in the fourth pass. In addition, since both sides of the color streaks portion are the first regions A1 of dot charge rate 25%, the sides of the white streaks portion are the dot charge rate of 100% after recording of the fourth pass. Accordingly, the difference of dot charge rates of the color streaks portion and the both sides thereof is 25%. The description used figures is omitted in a comparative example of a case where color streaks are overlapped. However, the dot charge rate of the color streaks portion (overlapped portion) is 150%, and the dot charge rate of the both sides thereof 100%. Accordingly, in the comparative example, a dot charge rate of the color streaks portion is as high as 50% on both sides thereof. However, the dot charge rate is raised only 25% more than the first embodiment. Accordingly, it is possible that the white streaks are less noticeable in the first embodiment compared to the comparative example.

As described above, according to the first embodiment, the mask M1 is formed by dots being recorded so as to be D1<D3<D2, when a dot charge rate is D1 which is a ratio of dots that are recorded in one pass among the entirety of the dots in a first region A1 excluding a region overlapped with boundary lines of other overlapped mask M2, when a dot charge rate of a second region A2 is D2 which is overlapped with boundary lines of other overlapped mask among the dot recording regions DS11 and DS14, and when a dot charge rate of a third region A3 is D3 which is a region excluding the first region A1 and the second region A2 among the first mask regions, in a region including boundary lines which are outer edges of dot recording regions DS11 and DS14 (the first mask region). That is, since dots are recorded such that a dot charge rate of the first region A1 is small and a dot charge rate of the second region A2 is great, the white streaks or the color streaks are generated between the first regions A1 with a small dot charge rate (small dot density), for example, even when dot recording positions between passes are shifted. However, since over-striking is performed on the second regions A2 with a great dot charge rate (great dot density) in the regions, it is possible that the generated white streaks or color streaks are less noticeable. In addition, there are cases where sizes or densities of the dots are different between passes, even when the dot recording positions are not shifted. Even in these cases, it is possible that the generated white streaks or color streaks are less noticeable.

Second Embodiment

Figure 10:
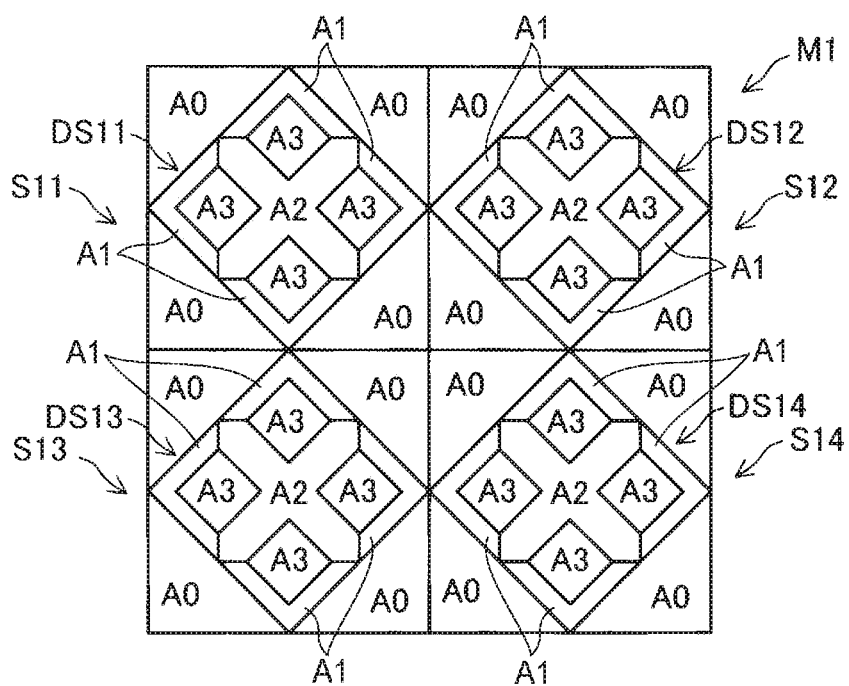
FIG. 10 is an explanatory view illustrating the mask used in the first pass in a second embodiment.

FIG. 10 is an explanatory view illustrating the mask M1 used in the first pass in a second embodiment. In addition, masks M2 to M4 used in the second pass to the fourth pass are the same mask as the mask M1. Similar to the first embodiment, the mask M1 is divided into four mask regions S11, S12, S13, and S14. The positions of the four mask regions S11, S12, S13, and S14 are the same as first embodiment. Boundary lines of the four mask regions S11, S12, S13, and S14 are parallel to the main scanning direction and the sub-scanning direction in the first embodiment. However, the second embodiment is different from the first embodiment in that the boundary lines are not parallel to the main scanning direction and the sub-scanning direction. In the second embodiment, since the four mask regions S11, S12, S13, and S14 have the same shape, the mask region S11 will be described as an example.

The mask region S11 is divided into four regions A0, A1, A2, and A3. The regions A0 are non-recording regions on which dots are not recorded, and provided in the four corners of the mask region S11. The regions A1 to A3 constitute the dot recording region DS11 on which dots are recorded. The first regions A1 are a region provided along the boundary lines (boundary lines with regions A0 which are dot non-recording regions) which are an outer edge of the dot recording region DS11. The second regions A2 are regions that are overlapped with the first regions A1 of other masks M3 and M4 when applying other masks M3 and M4 in the dot recording regions DS11, that is, regions including boundary lines of dot recording regions DS31 to DS34, and DS41 to DS44 in other masks M3 and M4. The third regions A3 are regions other than the first regions A1 and the second regions A2 in the dot recording region DS11. The dot charge rate of the regions A1 to A3 is the same as the first embodiment. In addition, the dot recording regions of the mask regions S12, S13, and S14 are called as DS12, DS13, and DS14, respectively. In this embodiment, the shape and the size of all of four regions A0 in the center of FIG. 10 are the same as the dot recording regions DS11.

Figure 11A:
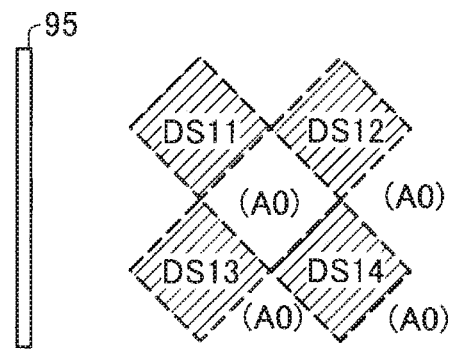
FIGS. 11A to 11C are explanatory views schematically illustrating positions of the nozzle array and dot recording regions in three passes from the first pass to the third pass.
Figure 11B:
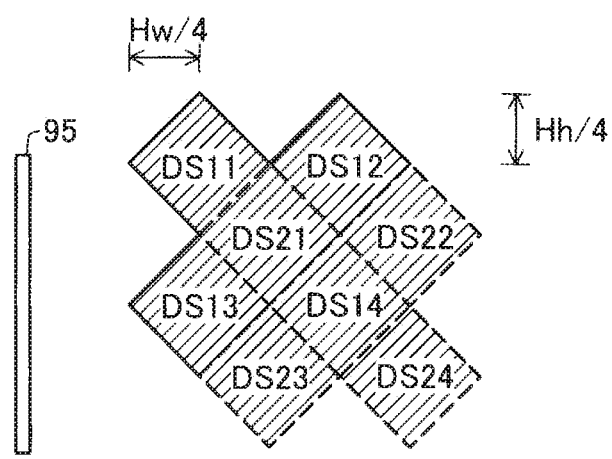
Figure 11C:
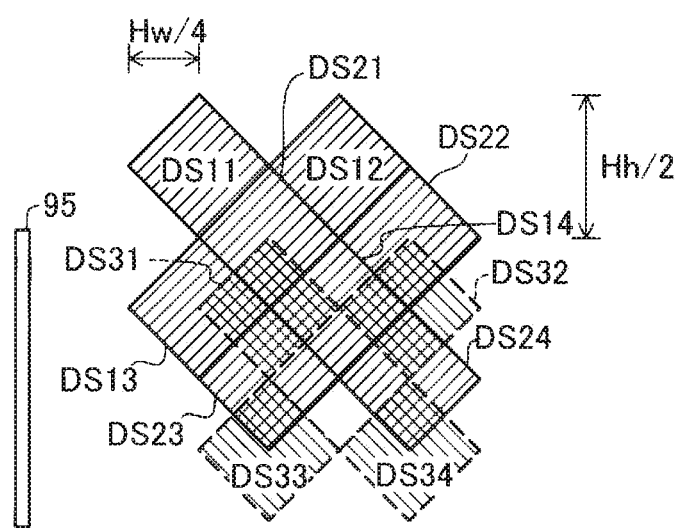

FIGS. 11A to 11C are explanatory views schematically illustrating positions of the nozzle array 95 and dot recording regions in three passes from the first pass to the third pass. FIG. 11A illustrates a state where the first pass is recorded. In the first pass, regions corresponding to the dot recording regions DS11, DS12, DS13, and DS14 are recorded in a checker pattern. FIG. 11B illustrates a state where the second pass is recorded. In the second pass, the nozzle array 95 performs dot recording at a position, as a start position, at which the nozzle array 95 is moved by Hh/4 in the sub-scanning direction and by Hw/4 in the main scanning direction with respect to the first pass. The regions DS21 and DS22 are recorded so as to fill the regions A0 that are recorded in the first pass. In this embodiment, one layer is formed in the first pass and the second pass. In addition, one layer is also formed in the third pass and the fourth pass.

FIG. 11C illustrates a state where the third pass is recorded. In the third pass, the nozzle array 95 performs dot recording at a position, as a start position, at which the nozzle array 95 is moved by Hh/2 in the sub-scanning direction and by Hw/4 in the main scanning direction with respect to the first pass. As a result, a dot recording region DS31 is overlapped with the dot recording regions DS13, DS21, DS14, and DS23. The same is applied to the dot recording regions DS32, DS33, and DS34. Although illustration is omitted in the fourth pass, similarly, dot recording regions DS41 to DS44 are recorded so as to fill regions A0 where dots are not recorded in the third pass.

Figure 12:
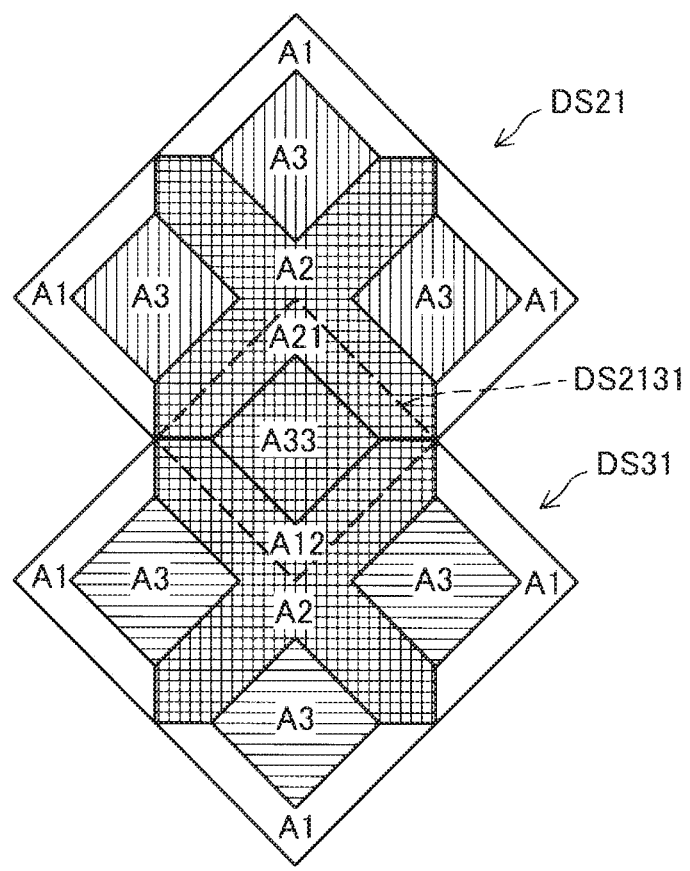
FIG. 12 is an explanatory view illustrating a portion where a dot recording region in the second pass and a dot recording region in the third pass are overlapped with each other.

FIG. 12 is an explanatory view illustrating a portion DS2131 where a dot recording region DS21 in the second pass and a dot recording region DS31 in the third pass are overlapped with each other. The overlapped portion DS2131 can be divided into three regions of regions A21, A12, and A33. The region A21 is a region where the second region A2 of the dot recording region DS21 and the first region A1 of the dot recording region DS31 are overlapped with each other. The region A12 is a region where the first region A1 of the dot recording region DS21 and the second region A2 of the dot recording region DS31 are overlapped with each other. The region A33 is a region where the third region A3 of the dot recording region DS21 and the third region A3 of the dot recording region DS31 are overlapped with each other. Similar to the first embodiment, in the dot recording region DS12, dots (dots recorded in the second region A2 of the dot recording region DS21, dot charge rate 75%) recorded in the second pass and dots (dots recorded in the first region A1 of the dot recording region DS31, dot charge rate 25%) recorded in the third pass are complementary to one another, and the entirety of the dots (total dot charge rate 100%) is recorded in the two passes. Similar to other regions A12 and A33, dots recorded in the second pass and dots recorded in the third pass are complementary to one another, and the entirety of the dots (total dot charge rate 100%) is recorded in the two passes. That is, the entirety of dots in the overlapped portion DS2131 is recorded in the two passes. The same is also applied to overlapped portions of two dot recording regions in other passes.

Also in the second embodiment, for example, even when the dot recording region DS11 in the first pass and the dot recording area DS21 in the second pass are shifted, and the white streaks (dot charge rate 0%) or the color streaks (dot charge rate 50%) are generated, since the dots are recorded in the third region A3 (dot charge rate 75%) in the third pass or the fourth pass, it is possible that the white streaks or the color streaks are less noticeable, similar to the first embodiment.

Third Embodiment

Figure 13A:
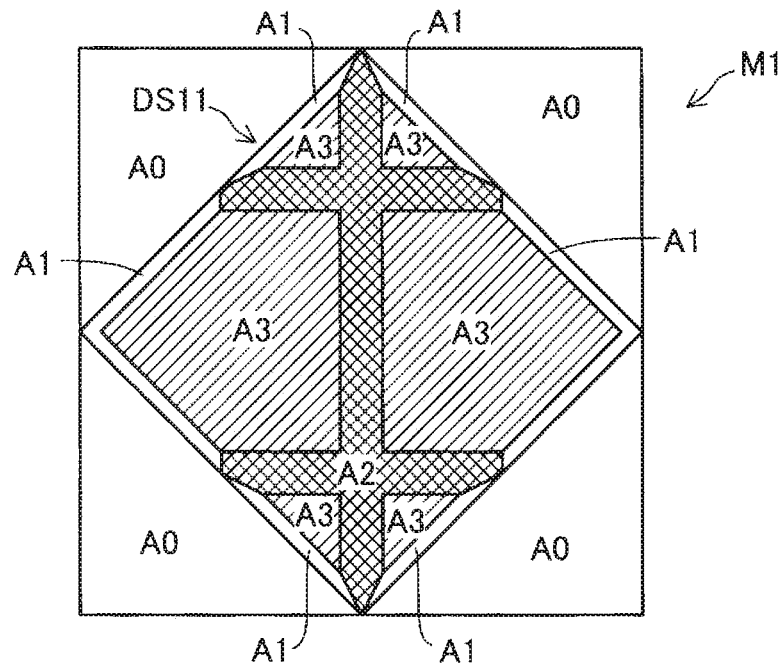
FIGS. 13A and 13B are explanatory views illustrating examples of masks used in a third embodiment.
Figure 13B:
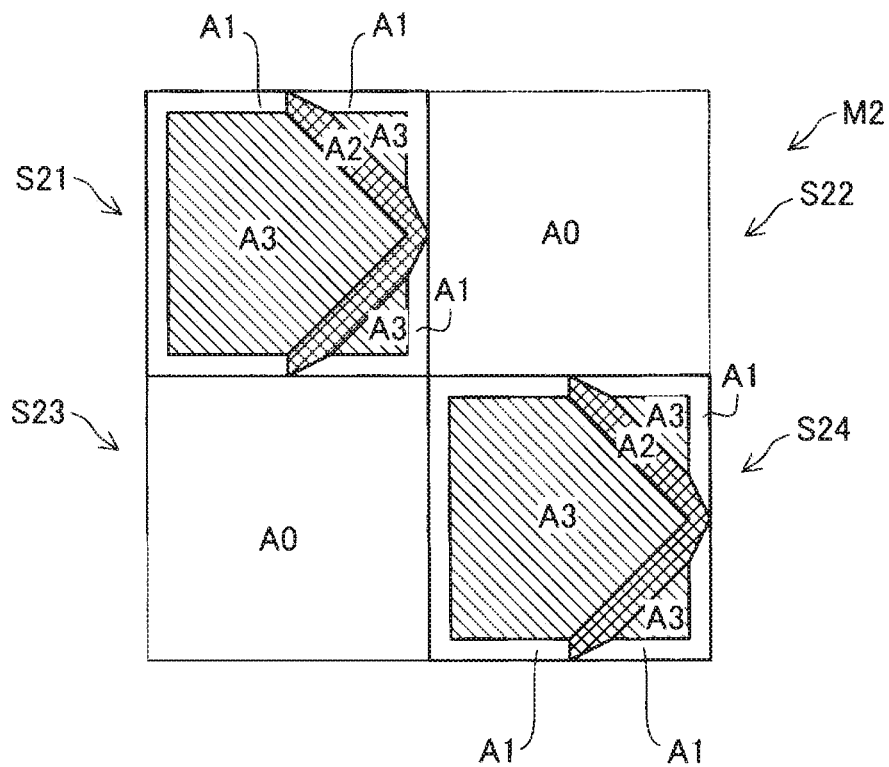

FIGS. 13A and 13B are explanatory views illustrating examples of masks used in a third embodiment. FIG. 13A illustrates a mask M1 used in the first pass and FIG. 13B illustrates a mask M2 used in the second pass. A mask M3 used in the third pass is the same as the mask M1, and a mask M4 used in the fourth pass is a mask to be horizontally inverted from the mask M2.

The mask M1 illustrated in FIG. 13A is divided into the dot recording region DS11 and four dot non-recording regions A0. The dot recording region DS11 further is divided into three regions A1, A2, and A3. The first regions A1 are provided along boundary lines of the dot recording region DS11. The second region A2 is a region which is overlapped with the first regions A1 of other masks M2 and M4 when applying the other masks M2 and M4. In addition, since the boundary lines of the region DS11 and dot recording regions DS21 and DS24 of the masks M2 and M4 are intersected, the boundary lines of the region DS11 are divided into the first regions A1 and the second region A2 in the vicinity of intersections thereof by boundary lines where distances between sides of the dot recording region DS11 and the dot recording regions DS21 and DS24 of the masks M2 and M4 are equidistant. The third regions A3 are regions other than the first regions A1 and the second region A2 in the dot recording region DS11.

A mask M2 illustrated in FIG. 13B includes four mask regions S21, S22, S23, and S24. The mask regions S21 and S24 are dot recording regions, the mask regions S22 and S24 are dot non-recording regions. The mask regions S21 and S24 are provided with the same shape, and further divided into three regions A1, A2, and A3, respectively. The three regions A1, A2, and A3 are referred to as a dot recording region DS21. The first regions A1 are provided along boundary lines of a mask region S21 (dot recording region DS21). The second regions A2 are regions which are overlapped with the first regions A1 of other masks M1 and M3 when applying the other masks M1 and M3. The third regions A3 are regions other than the first regions A1 and the second regions A2 in the mask region S21 (dot recording region DS21).

Figure 14A:
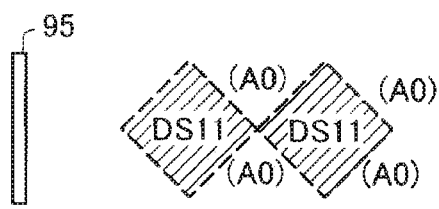
FIGS. 14A to 14D are explanatory views schematically illustrating positions of the nozzle array and dot recording regions in four passes from the first pass to the fourth pass.
Figure 14B:
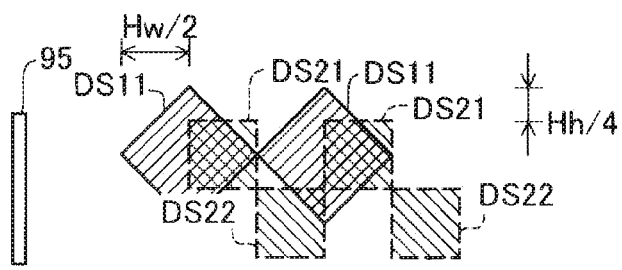
Figure 14C:
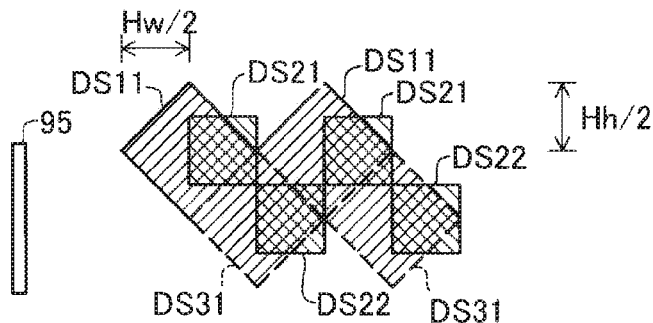
Figure 14D:
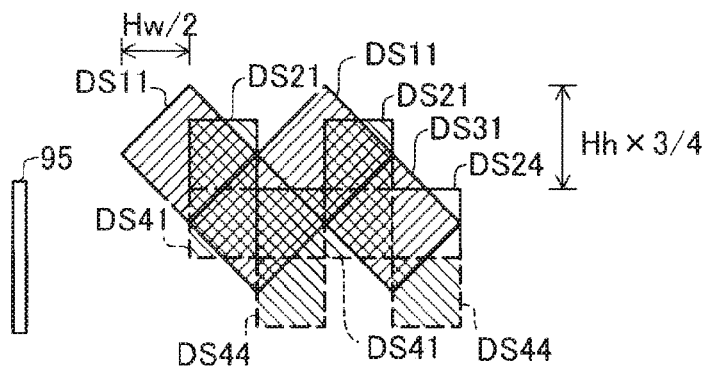

FIGS. 14A to 14D are explanatory views schematically illustrating positions of the nozzle array 95 and dot recording regions in four passes from the first pass to the fourth pass. FIG. 14A illustrates a state where the first pass is recorded. FIG. 14A illustrates a state where the mask M1 is applied two times in the main scanning direction. FIG. 14B illustrates a state where the second pass is recorded. Similarly, FIG. 14B illustrates a state where the mask M2 is applied two times. Dot recording positions in the second pass are shifted by Hw/2 in the main scanning direction and by Hh/4 in the sub-scanning direction from starting positions in the first pass. FIG. 14C illustrates a state where the third pass is recorded. A dot recording position in the third pass is shifted by Hw/2 in the main scanning direction and by Hh/2 in the sub-scanning direction from starting positions in the first pass. FIG. 14D illustrates a state where the fourth pass is recorded. Dot recording positions in the fourth pass are shifted by Hw/2 in the main scanning direction and by (¾)×Hh in the sub-scanning direction from starting positions in the first pass. In the sub-scanning direction, the positions are shifted by Hh/4 for every pass. In this embodiment, one layer is formed in the first pass and the third pass, and one layer is formed in the second pass and the fourth pass.

Figure 15A:
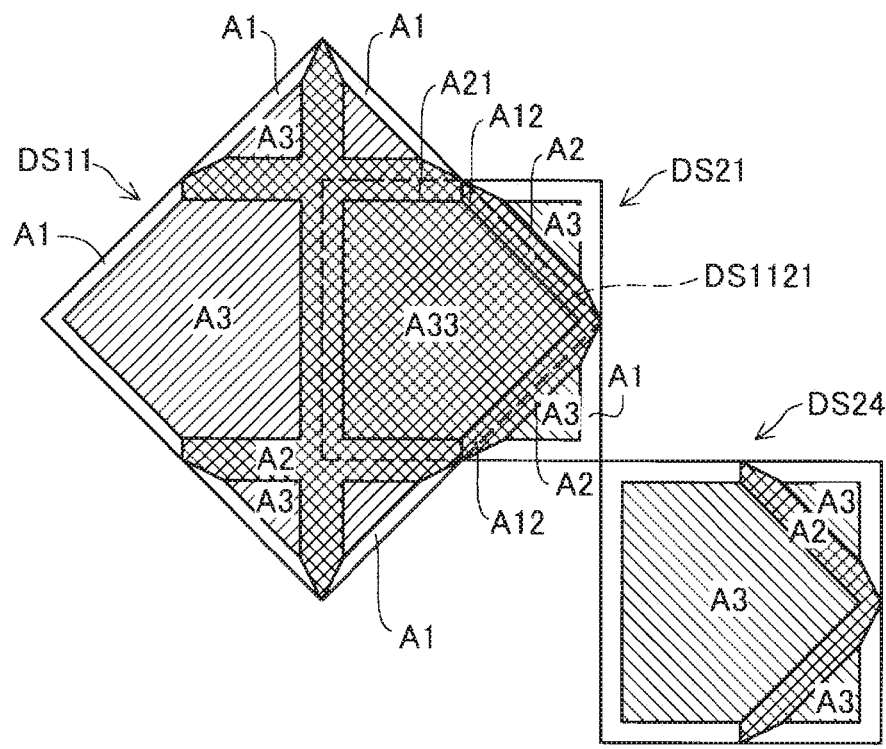
FIGS. 15A and 15B are explanatory views illustrating overlapped regions of two dot recording regions.
Figure 15B:
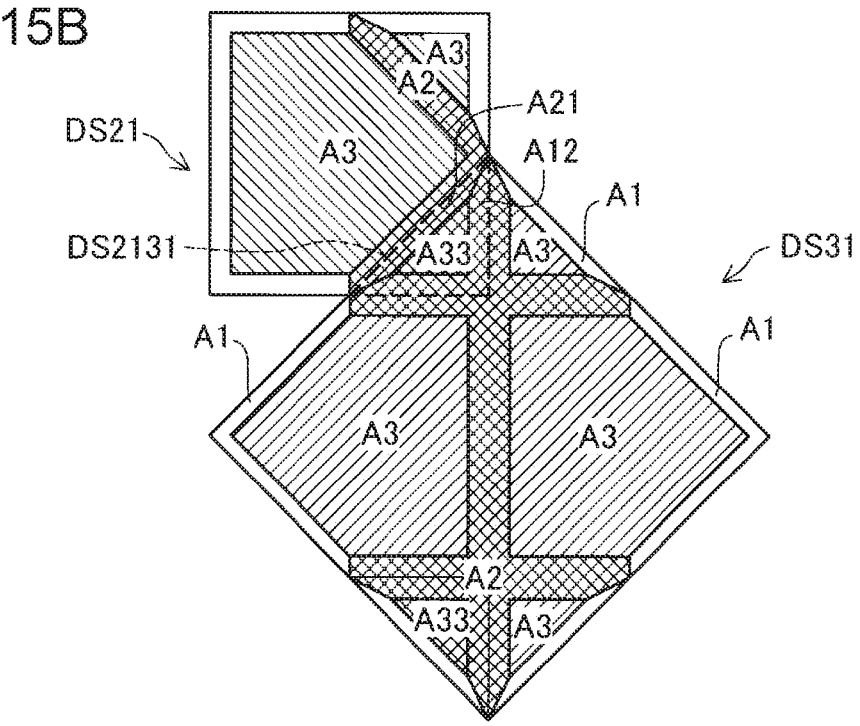

FIGS. 15A to 15B are explanatory views illustrating overlapped regions of two dot recording regions. FIG. 15A illustrates an overlapped portion DS1121 in which a dot recording region DS11 in the first pass and a dot recording region DS21 in the second pass are overlapped with each other. The overlapped portion DS1121 can be divided into three regions of regions A21, A12, and A33. The region A21 is a region in which the second regions A2 of the region DS11 and the first regions A1 of the region DS21 are overlapped with each other. The regions A12 are regions in which the first regions A1 of the region DS11 and the second regions A2 of the region DS21 are overlapped with each other. The regions A33 are regions in which the third regions A3 of the region DS11 and the third regions A3 of the region DS21 are overlapped with each other. Similar to the first embodiment, in the dot recording region A21, dots (dots recorded in the second region A2 of the dot recording region DS11, dot charge rate 75%) recorded in the first pass and dots (dots recorded in the first regions A1 of the dot recording region DS21, dot charge rate 25%) recorded in the second pass are complementary to one another, and the entirety of the dots (total dot charge rate 100%) are recorded in the two passes. Similar to other regions A12 and A33, dots recorded in the first pass and dots recorded in the second pass are complementary to one another, and the entirety of the dots (total dot charge rate 100%) is recorded in the two passes. That is, the entirety of dots in the overlapped portion DS1121 is recorded in the two passes.

FIG. 15B illustrates an overlapped portion DS2131 in which the dot recording regions DS21 in the second pass and the dot recording region DS31 in the third pass are overlapped with each other. The overlapped portion DS2131 can be divided into three regions of regions A21, A12, and A33. The region A21 is a region in which the second regions A2 of the region DS21 and the first regions A1 of the region DS31 are overlapped with each other. The region A12 is a region in which the first regions A1 of the region DS21 and the second regions A2 of the region DS31 are overlapped with each other. The regions A33 are regions in which the third regions A3 of the region DS21 and the third regions A3 of the region DS31 are overlapped with each other. Similar to the first embodiment, in the dot recording region A21, dots (dots recorded in the second region A2 of the dot recording region DS21, dot charge rate 75%) recorded in the second pass and dots (dots recorded in the first regions A1 of the dot recording region DS31, dot charge rate 25%) recorded in the third pass are complementary to one another, and the entirety of the dots (total dot charge rate 100%) is recorded in the two passes. Similar to other masks A12 and A33, since dots recorded in the second pass and dots recorded in the third pass are complementary to one another, and the entirety of the dots (total dot charge rate 100%) is recorded in the two passes. That is, the entirety of dots in the overlapped portion DS2131 is recorded in the two passes.

Also, in the third embodiment, for example, even when the white streaks (dot charge rate 0%) or color streaks (dot charge rate 50%) are generated by shifting the dot recording region DS11 in the first pass and the dot recording region DS31 in the third pass, since dots are recorded in the second region A2 (dot charge rate 75%) in the second pass or the fourth pass, it is possible that the white streaks or the color streaks are less noticeable similar to the first embodiment or the second embodiment.

In addition, as can be seen in the third embodiment, the shapes of the mask M1 in the first pass and the mask M2 in the second pass may not necessarily be the same. That is, as the first and second embodiments, the masks may be the same shape, or as the third embodiment, the masks may be different shapes.

Fourth Embodiment

Figure 16:
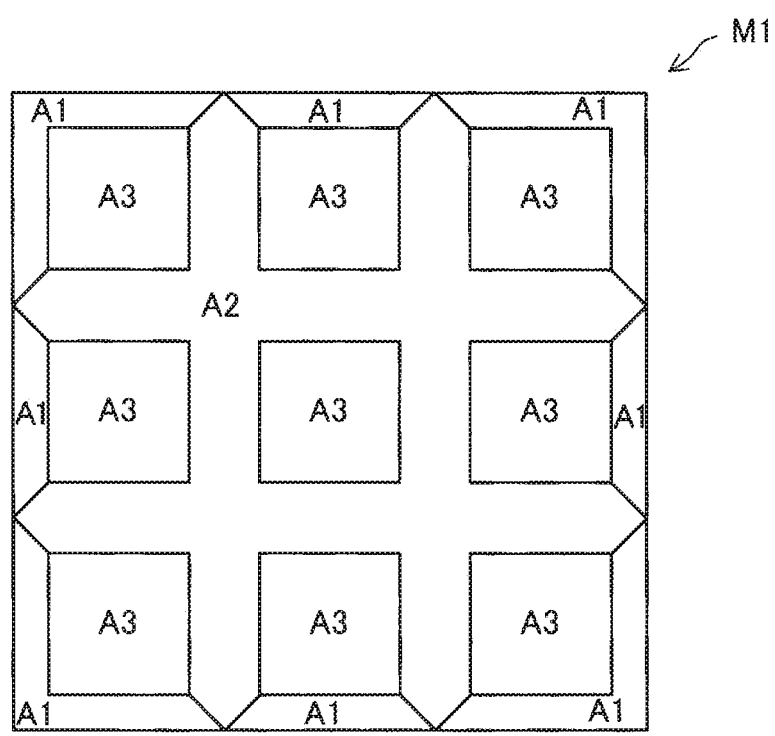
FIG. 16 is an explanatory view illustrating an example of a mask used in a fourth embodiment.
Figure 17A:
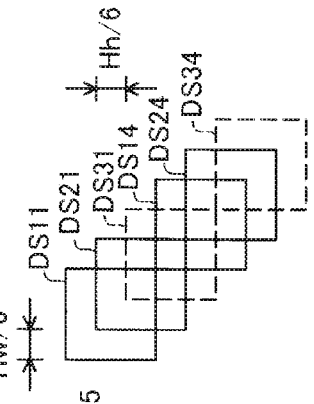
FIGS. 17A to 17F are explanatory views schematically illustrating positions of the nozzle array and dot recording regions in each pass.
Figure 17B:
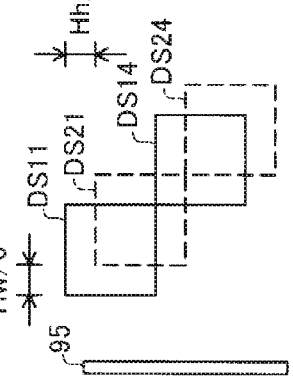
Figure 17C:
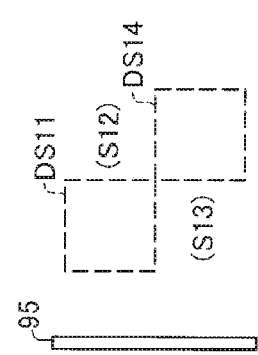
Figure 17D:
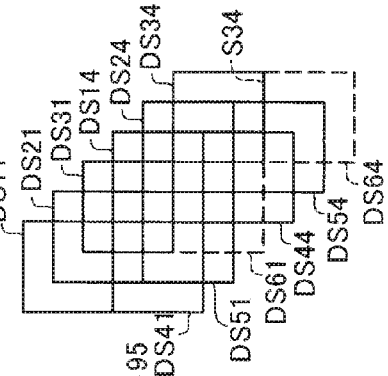
Figure 17E:
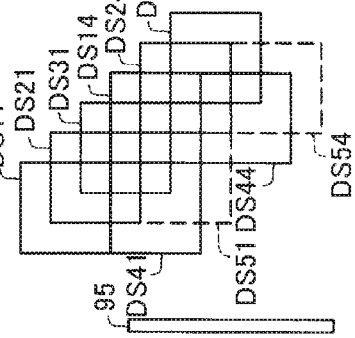
Figure 17F:
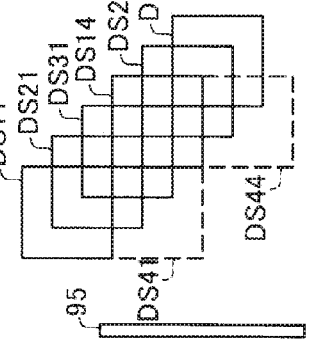

FIG. 16 is an explanatory view illustrating an example of a mask M1 used in a fourth embodiment. Dots are recorded in four passes in the first to third embodiments. However, in the fourth embodiment, dots are recorded in six passes. In the first embodiment, third regions A3 are arranged in two rows×two columns in the mask M1. However, the third embodiment is different from the first embodiment in that the third regions A3 are arranged in three rows×three columns in the mask M1. In addition, dot charge rate is 20% in the first regions A1, 40% in the second region A2, and 33.3% in the third regions A3.

FIGS. 17A to 17F are explanatory views schematically illustrating positions of the nozzle array 95 and dot recording regions in each pass. FIGS. 17A to 17F illustrate higher pairs completed from the first pass to the six pass, respectively. In each pass, the dot recording regions are recorded in a checker pattern similar to the first and second embodiments. In an n-th pass and an (n+1)-th pass, a dot recording starting position moves by Hh/6 in the sub-scanning direction and only by Hw/6 in the main scanning direction. In addition, a dot recording starting position in the main scanning direction in the fourth pass is the same as a dot recording starting position in the first pass.

Figure 18:
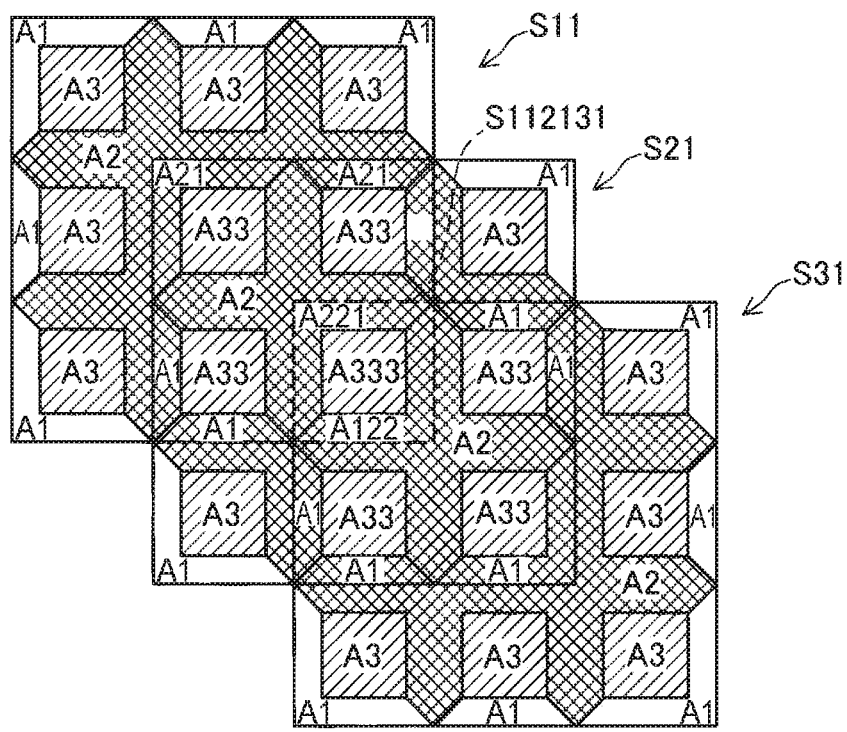
FIG. 18 is an explanatory view illustrating an overlapped portion in which a dot recording region in the first pass, a dot recording region in the second pass, and a dot recording region in the third pass are overlapped one another.

FIG. 18 is an explanatory view illustrating an overlapped portion DS112132 in which a dot recording region DS11 in the first pass, a dot recording region DS21 in the second pass, and a dot recording region DS311 in the third pass are overlapped one another. The overlapped portion DS112132 can be divided into three regions of A221, S122, and A333. The region A221 is a region in which a second region A2 of the recording region DS11, a second region A2 of the recording region DS21, and a first region A1 of the recording region DS31 are overlapped. The region A122 is a region in which a first region A1 of the recording region DS11, the second region A2 of the recording region DS21, and the second region A2 of the recording region DS31 are overlapped. The region A333 is a region in which a third region A3 of the recording region DS11, a third region A3 of the recording region DS21, and a third region A3 of the recording region DS31 are overlapped one other. When calculating in a similar manner to the first and second embodiments, the sum of dot charge rates in the region A221 (100%=40%+40%+20%), the region A122 (100%=20%+40%+40%), and the region A333 (100≅33.3%×3) is 100%. That is, the entirety of dots is recorded on the overlapped portion DS112132 in three passes.

Also in the fourth embodiment, for example, even when the dot recording region DS11 in the first pass and the dot recording region DS41 in the fourth pass are shifted, and the white streaks (dot charge rate 0%) or the color streaks (dot charge rate 40%) are generated, dots are recorded on the second region A2 (dot charge rate 40%) in the second and third passes. The dot charge rate of the white streaks portion is 80% and the dot charge rate of the color streaks portion is 120%. Similarly, in the comparative example (dot charge rate 33.3%), the dot charge rate of the white streaks portion is 66.7% and the dot charge rate of the color streaks portion is 133.2%, it is possible that the white streaks or the color streaks are less noticeable, similar to the first embodiment or the second embodiment. In the fourth embodiment, since layers are respectively formed in the first and fourth passes, the second and fifth passes, and the third and sixth passes, it is called as a configuration with three layers×two passes for each layer.

Fifth Embodiment

Figure 19:
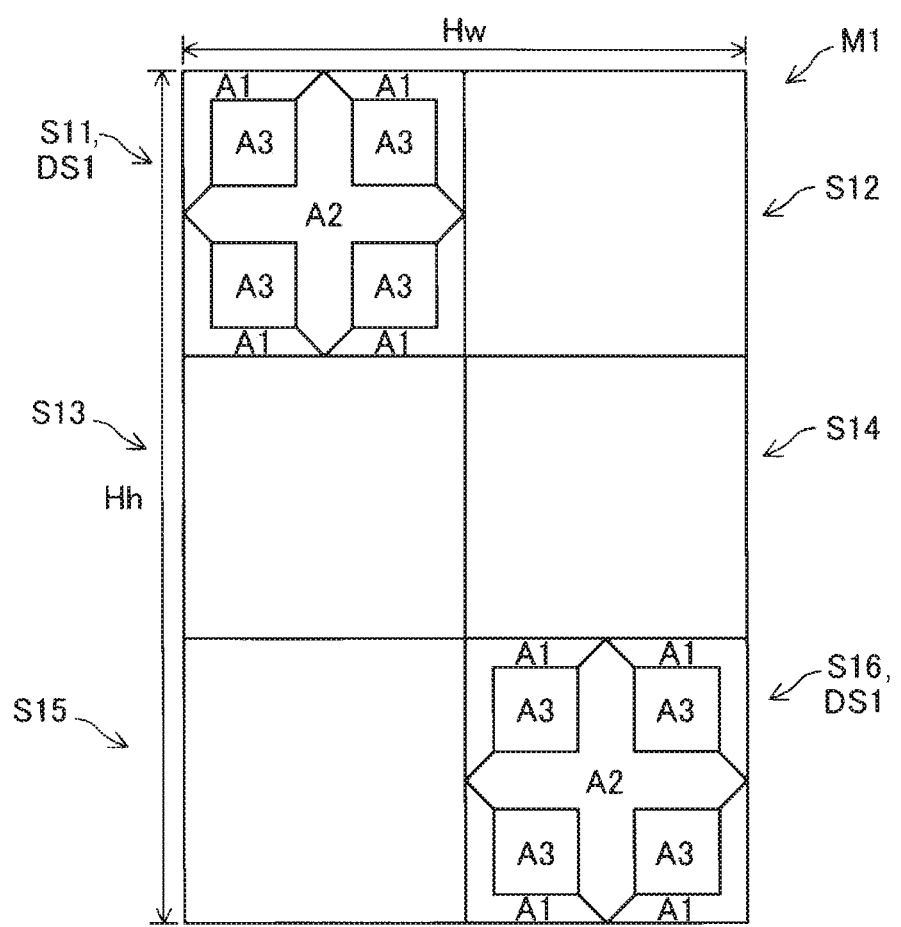
FIG. 19 is an explanatory view illustrating a mask used in the first pass in a fifth embodiment.

FIG. 19 is an explanatory view illustrating a mask M1 used in the first pass in the fifth embodiment. In addition, a mask the same shape as the mask M1 is used with respect to masks M2 to M6 used in the second pass to the sixth pass. The mask M1 is divided into total six mask regions S11, S12, S13, S14, S15, and S16 by dividing into two regions in the main scanning direction and three regions in the sub-scanning direction. The mask regions S11 and S16 are dot recording regions on which dots are recorded in each pass. The mask regions S11 and S16 are referred to as a "dot recording region DS1". The dot recording region DS1 is divided into regions A1, A2, and A3 similar to the first embodiment. The mask regions S12, S13, S14, and S15 are non-recording regions on which dots are not recorded.

FIGS. 20A to 20F are explanatory views schematically illustrating positions of the nozzle array 95 and dot recording regions in six passes from the first pass to the sixth pass. In the fifth embodiment, a virtual first layer is formed in the first pass, the third pass, and the fifth pass, and a virtual second layer is formed in the second pass, the fourth pass, and the sixth pass, and thereby dots are recorded in a total of six passes with two layers (×three passes for each layer). Even in this case, it is possible that the white streaks or the color streaks are less noticeable similar to the first embodiment.

As described the above, considering the fourth and fifth embodiments, dots are recorded in P (P is an integer, not a prime number, and is equal to or greater than four) passes, the mask in each pass is divided into a plurality of regions, the first region in the plurality of regions is a dot recording region on which dots are recorded, the second region in the plurality of regions is a dot non-recording region on which dots are not recorded, dots are recorded so as to overlap the first mask regions with each other in a state where the first mask regions of two masks or more among the P masks are shifted from each other on the recording medium, dots are recorded so as to be D1<D3<D2, when a dot charge rate is D1 which is a ratio of dots that are recorded in one pass of the entirety of the dots in a first region A1 excluding a region overlapped with boundary lines of other overlapped masks, when a dot charge rate of a second region A2 that is overlapped with the first region A1 of other masks in the first mask regions is D2, and when a dot charge rate of a third region A3 that is a region excluding the first region A1 and the second region A2 in the first mask regions is D3, in regions including boundary lines that form an outer edge of the first mask region in the first mask regions (dot recording regions), and thereby making it possible for the white streaks or the color streaks to be less noticeable.

In the fourth and fifth embodiments, the boundary lines in the dot recording region are parallel to the main scanning direction and the sub-scanning direction. However, as the second embodiment or the third embodiment, boundary lines of at least one dot recording region may include boundary line portions that are not parallel to any one of the main scanning direction and the sub-scanning direction.

In the above the first to fifth embodiments, the regions A1, A2, A3 are distinguished. However, a dot charge rate may gradually change at boundaries between the first region A1 and the second region A2. It is possible that the white streaks or the color streaks are less noticeable. The same is also applied at boundaries between the first region A1 and the third region A3, and boundaries between the second region A2 and the third region A3.

Modification Example

As described above, embodiments of the invention based on several embodiments are described. However, the embodiments of the invention described above are intended to facilitate the understanding of the invention, and do not limit the invention. The invention may be modified or improved without departing from the spirit and scope of the claims, and it is a matter of course that the invention includes equivalents thereof.

First Modification Example

In the above described embodiment, there are cases where the number of passes P (N×m) in multi-pass recording is four (two layers×two passes for each layer) and six (three layers×two passes for each layer and two layers×two passes for each layer). However, it is possible to use an integer, but not a prime number, that is equal to or greater than four as the number of passes. For example, eight passes (four layers×two passes for each layer and two layers×four passes for each layer), nine passes (three layers×three passes for each layer), and the like are also possible.

Second Modification Example

In the each embodiment, a movement amount at an application start position of a mask in the main scanning direction is none or Hw/4 when layers are different. However, it is possible to set an arbitrary value as the movement amount unless boundary lines of the dot recording region are overlapped. In addition, in this case, particularly shapes of A2 and A3 are different.

Third Modification Example

Furthermore, in the above described embodiment, it is described that the recording head is moved in the main scanning direction. However, the invention is not limited to the above configuration when the recording medium and the recording head are relatively moved in the main scanning direction and ink is ejected. For example, the recording medium may be moved in the main scanning direction in a state where the recording head is stopped. In addition, both of the recording medium and the recording head may be moved in the main scanning direction. In addition, the recording medium and the recording head may be relatively moved with respect to the sub-scanning direction. For example, as a flatbed type printer, a head unit may be moved in the X-Y direction and perform recording on a recording medium is mounted (fixed) on a table. That is, it may be configured to relatively move the recording medium and the recording head in at least one of the main scanning direction and the sub-scanning direction.

Fourth Modification Example

In the above described embodiment, a recording apparatus that ejects ink on a recording paper is described. However, this invention can be applied to various dot recording apparatuses other than the recording apparatus, for example, also to an apparatus for forming dots by ejecting droplets on a substrate. Furthermore, it may be adopted for a liquid ejecting apparatus that ejects or discharges liquid other than ink. It may be diverted to various liquid ejecting apparatuses including a liquid ejecting head for ejecting liquid droplets of a very small amount. In addition, the liquid droplets are referred to as a state of liquid ejected from the liquid ejecting apparatus, and include shapes such as grains, tears, and filaments. In addition, the liquid referred to herein may be a material to be ejected by a liquid ejecting apparatus. For example, it may be one of states when substance is a liquid, high or low viscosity liquid state, sol, gel water, other inorganic solvents, organic solvents, solutions, liquid resins, a flow state of liquid metals (metal melt), or liquid as one state of matter, material in which particles of the functional material made of solid material such as pigment or metal particles, and the like are dissolved, and dispersed or mixed in a solvent, or the like. In addition, ink or liquid crystal or the like as described in the above embodiment can be mentioned as a typical example of the liquid. Here, the ink includes various typed liquid compositions such as general water-based ink, oil-based ink, gel ink, hot melt ink, and the like. The liquid ejecting apparatus as specific examples may be, for example, a liquid crystal display, an EL (electroluminescence) display, a surface emission display, and a liquid ejecting apparatus that ejects liquid including form of dispersed or dissolved materials such as electrode material or color material used for manufacturing color filters. In addition, the liquid ejecting apparatus may be a liquid ejecting apparatus that ejects biological organic matter used for manufacturing biochips, a liquid ejecting apparatus that ejects liquid as a specimen used as a precision pipette, a textile recording apparatus, a micro dispenser, or the like. Furthermore, a liquid ejecting apparatus that ejects lubricating oil to pinpoints of a precision machine such as a watch and a camera, a liquid ejecting apparatus that ejects transparent resin liquid such as ultraviolet curing resin and the like on a substrate in order to form a micro hemispherical lens used (optical lens) for an optical communication element or the like, and a liquid ejecting apparatus that ejects etchant such as acid, alkali, and the like for etching substrates or the like may be adopted.

The entire disclosure of Japanese Patent Application No. 2015-050539, filed Mar. 13, 2015 is expressly incorporated by reference herein.

What is claimed is:

1. A dot recording apparatus comprising:
a recording head including a plurality of nozzles;
a main scanning driving mechanism that performs main scanning passes for forming dots on a recording medium while relatively moving the recording head and the recording medium in a main scanning direction;
a sub-scanning driving mechanism that performs sub-scanning for relatively moving the recording medium and the recording head in a sub-scanning direction intersected with the main scanning direction; and
a controller that controls the recording head, the main scanning driving mechanism, and the sub scanning driving mechanism,
wherein the controller performs recording of dots in the main scanning pass of P times (P is an integer, not a prime number, and is equal to or greater than four) on a main scanning line, the main scanning pass including at least a first pass, a second pass, and a third pass, sequentially, each pass using one mask of P masks that illustrate pixel positions of a dot recording target, each of the P masks being divided into a plurality of regions,
wherein the plurality of regions in each of the P masks includes a first mask region, the first mask region being a dot recording region including a pixel position on which a dot is recorded,
wherein the plurality of regions in each of the P masks includes a second mask region, the second mask region being a dot non-recording region including only a pixel position on which a dot is not recorded,
wherein recording of dots is performed so as to overlap the first mask regions with each other in a state where the first mask regions of two masks or more among the P masks are shifted from each other on the recording medium, a first mask region in the first pass overlapping a first mask region in the second pass, the first mask region in the second pass overlapping a first mask region in the third pass, and
wherein the first mask region in the second pass includes a first region A1, a second region A2 and a third region A3, the first region A1 being arranged on an inner side of boundary lines that form an outer edge of the first mask region in the second pass, the second region A2 being arranged to overlap with and extend along a boundary line of the first mask region in the first pass and a boundary line of the first mask region in the third pass, and the third region A3 being different region from the first region A1 and the second region A2, dots are recorded so as to be D1<D3<D2, where a dot charge rate is a ratio of dots that are recorded in one pass to the entirety of the dots and a dot charge rate of the first region A1 is defined as D1, a dot charge rate of the second region A2 is defined as D2, and a dot charge rate of the third region A3 is defined as D3.

2. The dot recording apparatus according to claim 1, wherein the boundary lines are not parallel to any one of the main scanning direction and the sub-scanning direction.

3. The dot recording apparatus according to claim 1, wherein a shape of the first mask region in the first pass and a shape of the first mask region in the second pass are the same shape.

4. The dot recording apparatus according to claim 1, wherein a shape of the first mask region in the first pass and a shape of the first mask region in the second pass are different shapes.

5. The dot recording apparatus according to claim 1, wherein the controller gradually changes a dot charge rate in at least one of a boundary between the first region A1 and the second region A2, a boundary between the first region A1 and the third region A3, and a boundary between the second region A2 and the third region A3.

6. The dot recording apparatus according to claim 1, wherein all of regions of at least the one first mask region in the second pass are set to be covered with other regions of other first mask regions in the passes.

7. The dot recording apparatus according to claim 1, wherein a part of the second region A2 extends from a periphery of the first mask region in the second pass to a center of the first mask region in the second pass.

8. A dot recording method comprising:
performing main scanning passes through which dots are formed on a recording medium while relatively moving a recording head and the recording medium in a main scanning direction, and multi-pass recording through which recording of dots is terminated in main scanning pass of P times (P is an integer, not a prime number, and is equal to or greater than four) on a main scanning line, the main scanning pass including at least a first pass, a second pass, and a third pass, sequentially,
wherein in the multi-pass recording,
each of the first pass, the second pass, and the third pass using one mask of P masks that illustrate pixel positions of a dot recording target, each of the P masks being divided into a plurality of regions,
the plurality of regions in each of the P masks includes a first mask region, the first mask region being a dot recording region including a pixel position on which a dot is recorded,
the plurality of regions in each of the P masks includes a second mask region, the second mask region being a dot non-recording region including only pixel positions on which a dot is not recorded,
recording of dots is performed so as to overlap the first mask regions with each other in a state where the first mask regions of two masks or more among the P masks are shifted from each other on the recording medium, a first mask region in the first pass overlapping a first mask region in the second pass, the first mask region in the second pass overlapping a first mask region in the third pass, and
the first mask region in the second pass includes a first region A1, a second region A2 and a third region A3, the first region A1 being arranged on an inner side of boundary lines that form an outer edge of the first mask region in the second pass, the second region A2 being arranged to overlap with and extend along a boundary line of the first mask region in the first pass and a boundary line of the first mask region in the third pass, and the third region A3 being different region from the first region A1 and the second region A2, dots are recorded so as to be D1<D3<D2, where a dot charge rate is a ratio of dots that are recorded in one pass to the entirety of the dots and a dot charge rate of the first region A1 is defined as D1, a dot charge rate of the second region A2 is defined as D2, and a dot charge rate of the third region A3 is defined as D3.

9. The dot recording method according to claim 8, wherein all of regions of at least the one first mask region in the second pass are set to be covered with other regions of other first mask regions in the passes.

10. The dot recording method according to claim 8, wherein a part of the second region A2 extends from a periphery of the first mask region in the second pass to a center of the first mask region in the second pass.

11. A non-transitory computer-readable medium storing therein a program for causing a computer to execute process comprising the steps of:
performing main scanning passes through which dots are formed on a recording medium while relatively moving a recording head and the recording medium in a main scanning direction, and multi-pass recording through which recording of dots is terminated in main scanning pass of P times (P is an integer, not a prime number, and is equal to or greater than four) on a main scanning line, the main scanning pass including at least a first pass, a second pass, and a third pass, sequentially,
wherein in the multi-pass, recording,
each of the first pass, the second pass, and the third pass using one mask of P masks that illustrate pixel positions of a dot recording target, each of the P masks being divided into a plurality of regions,
the plurality of regions in each of the P masks includes a first mask region, the first mask region being a dot recording region including a pixel position on which a dot is recorded,
the plurality of regions in each of the P masks includes a second mask region, the second mask region being a dot non-recording region including only pixel positions on which a dot is not recorded,
recording of dots is performed so as to overlap the first mask regions with each other in a state where the first mask regions of two masks or more among the P masks are shifted from each other on the recording medium, a first mask region in the first pass overlapping a first mask region in the second pass, the first mask region in the second pass overlapping a first mask region in the third pass, and
the first mask region in the second pass includes a first region A1, a second region A2 and a third region A3, the first region A1 being arranged on an inner side of boundary lines that form an outer edge of the first mask region in the second pass, the second region A2 being arranged to overlap with and extend along a boundary line of the first mask region in the first pass and a boundary line of the first mask region in the third pass, and the third region A3 being different region from the first region A1 and the second region A2, dots are recorded so as to be D1<D3<D2, where a dot charge rate is a ratio of dots that are recorded in one pass to the entirety of the dots and a dot charge rate of the first region A1 is defined as D1, a dot charge rate of the second region A2 is defined as D2, and a dot charge rate of the third region A3 is defined as D3.

12. The non-transitory computer-readable medium according to claim 11, wherein all of regions of at least the one first mask region in the second pass are set to be covered with other regions of other first mask regions in the passes.

13. The non-transitory computer-readable medium according to claim 11, wherein a part of the second region A2 extends from a periphery of the first mask region in the second pass to a center of the first mask region in the second pass.

14. A method of manufacturing a recording medium comprising:

performing a main scanning pass through which dots are formed on the recording medium while relatively moving a recording head and the recording medium in a main scanning direction, and multi-pass recording through which recording of dots is terminated in main scanning pass of P times (P is an integer, not a prime number, and is equal to or greater than four) on a main scanning line, the main scanning pass including at least a first pass, a second pass, and a third pass, sequentially, wherein in the multi-pass recording each of the first pass, the second pass, and the third pass using one mask of P masks that illustrate pixel positions of a dot recording target, each of the P masks being divided into a plurality of regions, the plurality of regions in each of the P masks includes a first mask region, the first mask region being is a dot recording region including a pixel position on which a dot is recorded, the plurality of regions in each of the P masks includes a second mask region, the second mask region being a dot non-recording region including only pixel positions on which a dot is not recorded, recording of dots is performed so as to overlap the first mask regions with each other in a state where the first mask regions of two masks or more among the P masks are shifted from each other on the recording medium, a first mask region in the first pass overlapping a first mask region in the second pass, the first mask region in the second pass overlapping a first mask region in the third pass, and the first mask region in the second pass includes a first region A1, a second region A2 and a third region A3, the first region A1 being arranged on an inner side of boundary lines that form an outer edge of the first mask region in the second pass, the second region A2 being arranged to overlap with and extend along a boundary line of the first mask region in the first pass and a boundary line of the first mask region in the third pass, and the third region A3 being different region from the first region A1 and the second region A1, dots are recorded so as to be D1<D3<D2, where a dot charge rate is a ratio of dots that are recorded in one pass to the entirety of the dots and a dot charge rate of the first region A1 is defined as D1, a dot charge rate of the second region A2 is defined as D2, and a dot charge rate of the third region A3 is defined as D3.

15. The method of manufacturing a recording medium according to claim 14, wherein all of regions of at least the one first mask region in the second pass are set to be covered with other regions of other first mask regions in the passes.

16. The method of manufacturing a recording medium according to claim 14, wherein a part of the second region A2 extends from a periphery of the first mask region in the second pass to a center of the first mask region in the second pass.

* * * * *